United States Patent [19]

Weerackody et al.

[11] Patent Number: 5,671,156
[45] Date of Patent: Sep. 23, 1997

[54] TRANSMISSION METHOD AND SYSTEM FOR JPEG IMAGES

[75] Inventors: Vijitha Weerackody, Watchung; Yong Zhou, Washington Township, both of N.J.

[73] Assignee: Lucent Technologies Inc., Murray Hill, N.J.

[21] Appl. No.: 422,409

[22] Filed: Mar. 31, 1995

[51] Int. Cl.[6] .................. G06K 15/00; H04L 1/18; H04B 1/02
[52] U.S. Cl. .................. 364/514 R; 371/30; 371/32; 371/35; 455/91; 375/295; 375/346
[58] Field of Search .................. 455/52.3, 56.1, 455/135, 91, 277.1, 277.2, 33.1; 375/267, 224, 347, 346, 295; 371/35, 43, 37.1, 37.4, 32, 30, 40.3; 379/57; 348/264, 393, 394, 395, 396, 398, 409; 358/432, 433, 426; 364/514 R, 400

[56] References Cited

U.S. PATENT DOCUMENTS

| | | | |
|---|---|---|---|
| 5,223,926 | 6/1993 | Stone et al. | 348/396 |
| 5,253,078 | 10/1993 | Balkanski et al. | 358/426 |
| 5,305,353 | 4/1994 | Weerackody | 375/347 |
| 5,349,348 | 9/1994 | Anderson et al. | 341/51 |
| 5,491,723 | 2/1996 | Diepstraten | 375/267 |

*Primary Examiner*—Wellington Chin
*Assistant Examiner*—Melissa Kay Carman

[57] ABSTRACT

The present invention is an improved transmission system for JPEG images. The present invention may include a separator for separating the JPEG image into Type-I and Type-II information and a transmitter for transmitting the Type-I and Type-II information over a wire or wireless communication medium to a receiver with unequal error protection, wherein the more error sensitive Type-I information is provided with more powerful error protection than the less sensitive Type-II information which makes up the bulk of the JPEG image. The present invention may further include a combiner for combining the Type-I and Type-II information received by the receiver in a JPEG format suitable for the data sink.

42 Claims, 29 Drawing Sheets

Nondifferential Huffman Coded Frames

| CODE | LENGTH | DESCRIPTION |
|---|---|---|
| 0xffc0 | V | Baseline DCT |
| 0xffc1 | V | Extended sequential DCT |
| 0xffc2 | V | Progressive DCT |
| 0xffc3 | V | Lossless (sequential) |

Differential Huffman Coded Frames

| CODE | LENGTH | DESCRIPTION |
|---|---|---|
| 0xffc5 | V | Differential sequential DCT |
| 0xffc6 | V | Differential progressive DCT |
| 0xffc7 | V | Differential lossless |

Nondifferential Arithmetic Coded Frames

| CODE | LENGTH | DESCRIPTION |
|---|---|---|
| 0xffc9 | V | Extended sequential DCT |
| 0xffca | V | Progressive DCT |
| 0xffcb | V | Lossless (sequential) |

Differential Arithmetic Coded Frames

| CODE | LENGTH | DESCRIPTION |
|---|---|---|
| 0xffcd | V | Differential sequential DCT |
| 0xffce | V | Differential progressive DCT |
| 0xffcf | V | Differential lossless |

FIG. 2

PRIOR ART

| CODE | LENGTH | DESCRIPTION |
|---|---|---|
| 0xff01 | N | For temporary use in arithmetic coding |
| 0xff02-0xffbf | U | Reserved |
| 0xffc4 | V | Define Huffman table(s) |
| 0xffc8 | U | Reserved for JPEG extensions |
| 0xffcc | V | Define arithmetic conditioning table(s) |
| 0xffd0-0xffd7 | N | Restart with modulo 8 counter |
| 0xffd8 | N | Start of image |
| 0xffd9 | N | End of image |
| 0xffda | V | Start of scan |
| 0xffdb | V | Define quantization table(s) |
| 0xffdc | 4 | Define number of lines |
| 0xffdd | 4 | Define restart interval |
| 0xffde | V | Define hierarchical progression |
| 0xffdf | 3 | Expand reference image |
| 0xffe0-0xffef | V | Reserved for application use |
| 0xfff0-0xfffd | U | Reserved for JPEG extensions |
| 0xfffe | V | Comment |

FIG. 3

PRIOR ART

| WORD NO. | WORD (0X) | WORD NO. | WORD (0X) | WORD NO. | WORD (0X) |
|---|---|---|---|---|---|
| 0 | ffd8ffe0 | 36 | 32323232 | 72 | 43444546 |
| 1 | 104a46 | 37 | 32323232 | 73 | 4748494a |
| 2 | 49460001 | 38 | 32323232 | 74 | 53545556 |
| 3 | 1000001 | 39 | 3232ffc0 | 75 | 5758595a |
| 4 | 10000 | 40 | 110802 | 76 | 63646566 |
| 5 | ffdb0043 | 41 | 30003 | 77 | 6768696a |
| 6 | 80606 | 42 | 1220002 | 78 | 73747576 |
| 7 | 7060508 | 43 | 11010311 | 79 | 7778797a |
| 8 | 7070709 | 44 | 1ffc400 | 80 | 83848586 |
| 9 | 9080a0c | 45 | 1f000001 | 81 | 8788898a |
| 10 | 140d0c0b | 46 | 5010101 | 82 | 92939495 |
| 11 | b0c1912 | 47 | 1010100 | 83 | 96979899 |
| 12 | 130f141d | 48 | 0 | 84 | 9aa2a3a4 |
| 13 | 1af1e1d | 49 | 1 | 85 | a5a6a7a8 |
| 14 | 1a1c1c20 | 50 | 2030405 | 86 | a9aab2b3 |
| 15 | 242e2720 | 51 | 6070809 | 87 | b4b5b6b7 |
| 16 | 222c231c | 52 | a0bffc4 | 88 | b8b9bac2 |
| 17 | 1c283729 | 53 | b51000 | 89 | c3c4c5c6 |
| 18 | 2c303134 | 54 | 2010303 | 90 | c7c8c9ca |
| 19 | 34341f27 | 55 | 2040400 | 91 | d2d3d4d5 |
| 20 | 393d3832 | 56 | 5040400 | 92 | d6d7d8d9 |
| 21 | 3c2e3334 | 57 | 17d01 | 93 | dae1e2e3 |
| 22 | 32ffdb00 | 58 | 2030004 | 94 | e4e5e6e7 |
| 23 | 43010909 | 59 | 11051221 | 95 | e8e9eaf1 |
| 24 | 90c0b0c | 60 | 31410613 | 96 | f2f3f4f5 |
| 25 | 180d0d18 | 61 | 51610722 | 97 | f6f7f8f9 |
| 26 | 32211c21 | 62 | 71143281 | 98 | faffc400 |
| 27 | 32323232 | 63 | 91a10823 | 99 | 1f010003 |
| 28 | 32323232 | 64 | 42b1c115 | 100 | 1010101 |
| 29 | 32323232 | 65 | 52d1f024 | 101 | 1010101 |
| 30 | 32323232 | 66 | 33627282 | 102 | 1000000 |
| 31 | 32323232 | 67 | 90a1617 | 103 | 1 |
| 32 | 32323232 | 68 | 18191a25 | 104 | 2030405 |
| 33 | 32323232 | 69 | 26272829 | 105 | 6070809 |
| 34 | 32323232 | 70 | 2a343536 | 106 | a0bffc4 |
| 35 | 32323232 | 71 | 3738393a | 107 | b51100 |

FIG. 4A

| WORD NO. | WORD (0X) | WORD NO. | WORD (0X) | WORD NO. | WORD (0X) |
|---|---|---|---|---|---|
| 108 | 2010204 | 144 | c5c6c7c8 | 180 | 7b439beb |
| 109 | 4030407 | 145 | c9cad2d3 | 181 | cffd1f0 |
| 110 | 5040400 | 146 | d4d5d6d7 | 182 | 67b2ba8d |
| 111 | 1027700 | 147 | d8d9dae2 | 183 | 3bdbcaa |
| 112 | 1020311 | 148 | e3d4d5d6 | 184 | a7a12a71 |
| 113 | 4052131 | 149 | e7e8e9ea | 185 | 42d953d0 |
| 114 | 6124151 | 150 | f2f3f4f5 | 186 | cadbca46 |
| 115 | 7617113 | 151 | f6f7f8f9 | 187 | 33c29e95 |
| 116 | 22328108 | 152 | faffdd00 | 188 | d8496c97 |
| 117 | 144291a1 | 153 | 40001ff | 189 | 88d14009 |
| 118 | b1c10923 | 154 | da000c03 | 190 | 24ed0b9c |
| 119 | 3352f015 | 155 | 1000211 | 191 | 927d6a08 |
| 120 | 6272d10a | 156 | 311003f | 192 | 6da6b391 |
| 121 | 162434e1 | 157 | f9fea4 | 193 | adaee378 |
| 122 | 15f11718 | 158 | 8ede6981 | 194 | dd3901ba |
| 123 | 191a2627 | 159 | 31c4ee17 | 195 | 6d3e9f8d |
| 124 | 28292a35 | 160 | 82546715 | 196 | 65ed037f |
| 125 | 36373839 | 161 | 1d6f7875 | 197 | 6cec7fff |
| 126 | 3a434445 | 162 | c897207 | 198 | d2f0b8b4 |
| 127 | 46474849 | 163 | 182a777e | 199 | 9d467467 |
| 128 | 4a535455 | 164 | 74a4ecae | 200 | 8ac6e1d5 |
| 129 | 56575859 | 165 | 4ce5cb1b | 201 | 7ef158c9 |
| 130 | 5a636465 | 166 | 9fffd0f0 | 202 | 29cda2e |
| 131 | 66676869 | 167 | 91a75eb0 | 203 | a8ac15b4 |
| 132 | 6a737475 | 168 | c8b5988f | 204 | fb90cc32 |
| 133 | 76777879 | 169 | 64348ba7 | 205 | 188efd7 |
| 134 | 7a828384 | 170 | de336d5b | 206 | a468e50d |
| 135 | 85868788 | 171 | 594b6338 | 207 | 80c31596 |
| 136 | 898a9293 | 172 | 87a7ad7 | 208 | 394ef5cf |
| 137 | 94959697 | 173 | 62fa7797 | 209 | 723838f7 |
| 138 | 98999aa2 | 174 | 891970e | 210 | 15a9720a |
| 139 | a3a4a5a6 | 175 | c32b83c7 | 211 | c51dd3af |
| 140 | a7a8a9aa | 176 | 1ea29551 | 212 | 241561d3 |
| 141 | b2b3b4b5 | 177 | e26058ae | 213 | 39ee3deb |
| 142 | b6b7b8b9 | 178 | d518c28f | 214 | 8de2249b |
| 143 | bac2c3c4 | 179 | 5ed8ef59 | 215 | d0e5face |

FIG. 4B

| WORD NO. | WORD (0X) | WORD NO. | WORD (0X) | WORD NO. | WORD (0X) |
|---|---|---|---|---|---|
| 216 | b5b1ffd3 | 252 | 3fffd5f0 | 288 | d7f0a3a5 |
| 217 | f0f1a1ea | 253 | 692caea1 | 289 | dfa900d9 |
| 218 | a718d3ae | 254 | 2049048a | 290 | ce09e998 |
| 219 | 8e7a7ee8 | 255 | 4f62b4a2 | 291 | cf34bfd9 |
| 220 | d2ae81ab | 256 | c6eccab1 | 292 | 1a8ee0bf |
| 221 | b0cae997 | 257 | b697cc6 | 293 | 6ab8dc79 |
| 222 | 647b42c7 | 258 | e8bb0e4d | 294 | 3cb3cd7 |
| 223 | fa57a547 | 259 | 76f03c53 | 295 | a1db413c |
| 224 | 24b15c00 | 260 | 5d4735c4 | 296 | 71b6e5fd |
| 225 | a7780e01 | 261 | 2a969036 | 297 | d463ccdb |
| 226 | 39e067d6 | 262 | c68bf31 | 298 | 9f99bb60 |
| 227 | 97ed7749 | 263 | 472d50e | 299 | 1ed9e6af |
| 228 | 24b35bb4 | 264 | a97309d4 | | |
| 229 | 592db012 | 265 | 21d42d23 | | |
| 230 | 1810074e | 266 | 29129046 | | |
| 231 | 9dab8d62 | 267 | 5b2c7ffa | | |
| 232 | 5be872ba | 268 | f5cdede5 | | |
| 233 | efb1ffd4 | 269 | 7b7298fb | | |
| 234 | f0e3a1ea | 270 | 53ffd6f0 | | |
| 235 | aa406d36 | 271 | c6d1f524 | | |
| 236 | e813d8c2 | 272 | fbd61723 | | |
| 237 | cdfa530e | 273 | eb19a43a | | |
| 238 | 91a8abed | 274 | 4ea21431 | | |
| 239 | 6b1b80d8 | 275 | b1b800f7 | | |
| 240 | ce0c6735 | 276 | f2cd77ee | | |
| 241 | 38355bf0 | 277 | 57d50264 | | |
| 242 | ceef7702 | 278 | 3432e32b | | |
| 243 | 498c00c0 | 279 | e5b6783d | | |
| 244 | b0f6c64d | 280 | 73fa714e | | |
| 245 | 676a1e42 | 281 | 9551224b | | |
| 246 | ca925cdc | 282 | 62ed1b79 | | |
| 247 | c933119c | 283 | 7928ddfd | | |
| 248 | 3a9014fd | 284 | d7d47eb5 | | |
| 249 | 7e3f957 | 285 | c91c44ac | | |
| 250 | 3aacdf43 | 286 | aeb539dd | | |
| 251 | 995695f6 | 287 | 66ba1fff | | |

FIG. 4C

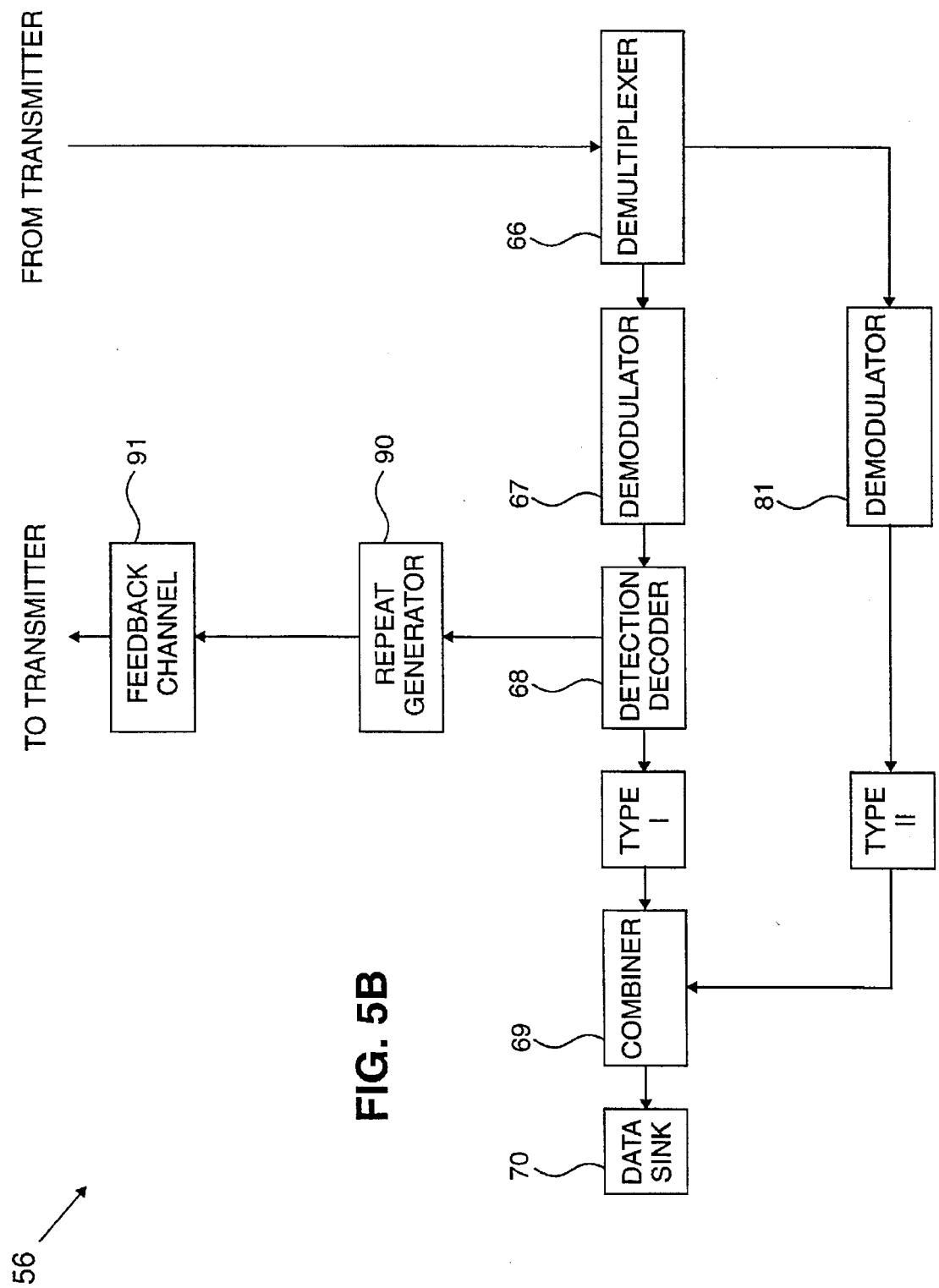

TRANSMISSION METHOD AND SYSTEM FOR JPEG IMAGES

FIELD OF THE INVENTION

The present invention relates generally to the field of communications, and particularly to JPEG image transmission over wire or wireless communication channels.

BACKGROUND OF THE INVENTION

JPEG is the international standard for still image compression. JPEG stands for the Joint Photographic Experts Group—the group which developed the international standard. A complete description of the JPEG standard is given in W. B. Pennebaker, J. L. Mitchell, *JPEG Still Image Data Compression Standard* (Van Norstrand Reinhold, New York 1993).

JPEG images are very sensitive to transmission errors. This sensitivity requires transmission over an almost error-free channel. To maintain an error-free channel involves advanced error correction coding techniques and/or retransmission of those portions of a JPEG image which are received in error.

Both protocols result in decreased channel throughput. For the error correcting protocols, bandwidth that could otherwise be used for transmitting the JPEG image is allocated for transmitting the redundancy bits of an error correction code. In the case of retransmission, the time that could otherwise be used to transmit another JPEG image, or at least more of the same JPEG image as a function of time, is allocated to retransmitting the erroneous portions of the JPEG image.

There is a need for a transmission method and system that can more efficiently use the scarce resources of a communication channel to transmit JPEG images.

SUMMARY OF THE INVENTION

The present invention provides a transmission method and system that more efficiently uses a communication channel to transmit JPEG images, and thereby increases the channel throughput. The present invention does this by separating the JPEG image into different types of information based on the sensitivity of each type of information to transmission errors, and then transmits the different types of information with unequal error protection.

One illustrative embodiment of the present invention is an apparatus comprising a separator for separating the JPEG image into Type-I and Type-II information and a transmitter for transmitting the Type-I information with more powerful error protection than the Type-II information.

The Type-I information, typically representing less than 10% of the JPEG image data, is the most error sensitive information, requiring an almost error-free channel for reliable data communication. The Type-II information, representing the remainder of the JPEG image, is the least sensitive, requiring less powerful error protection or none at all. Providing the Type-II information with less powerful error protection, or no error protection at all, increases the throughput and efficiency of the communication channel.

Another illustrative embodiment of the present invention may provide even further improvement in channel throughput and efficiency. This embodiment of the present invention comprises a separator for further separating the Type-I information into Type-IA and Type-IB information and a transmitter for transmitting the Type-IA information with more powerful error protection than the Type-IB information.

Further illustrative embodiments of the present invention are provided for receiving, processing, and combining the transmitted Type-I and Type-II information in a manner suitable for the data sink.

Additional illustrative embodiments of the present invention include different error protection protocols for providing unequal error protection to the different types of information in a JPEG image.

Still further illustrative embodiments of the present invention incorporate novel antenna diversity schemes for transmitting JPEG images over slow fading channels.

Other illustrative embodiments of the present invention provide an improved storage system for JPEG images.

BRIEF DESCRIPTION OF THE DRAWINGS

FIG. 2 is a table listing the start of frame markers in a JPEG image.

FIG. 3 is a table listing the other, non-start of frame markers in a JPEG image.

FIGS. 4A–4C are tables listing the first 300 4-byte hexadecimal words in a typical JPEG image.

FIGS. 5A–5F show illustrative embodiments of the present invention using an ARQ feedback channel.

DETAILED DESCRIPTION OF THE INVENTION

The Structure of a JPEG Still Image

JPEG compressed image data contains two classes of segments: entropy coded segments and marker segments. Entropy coded segments contain the entropy coded (e.g., Huffman or arithmetic coded) image data, and the marker segments contain header information, transformation and quantization tables, and other information required to interpret and decode the entropy coded image data.

Figure 1:
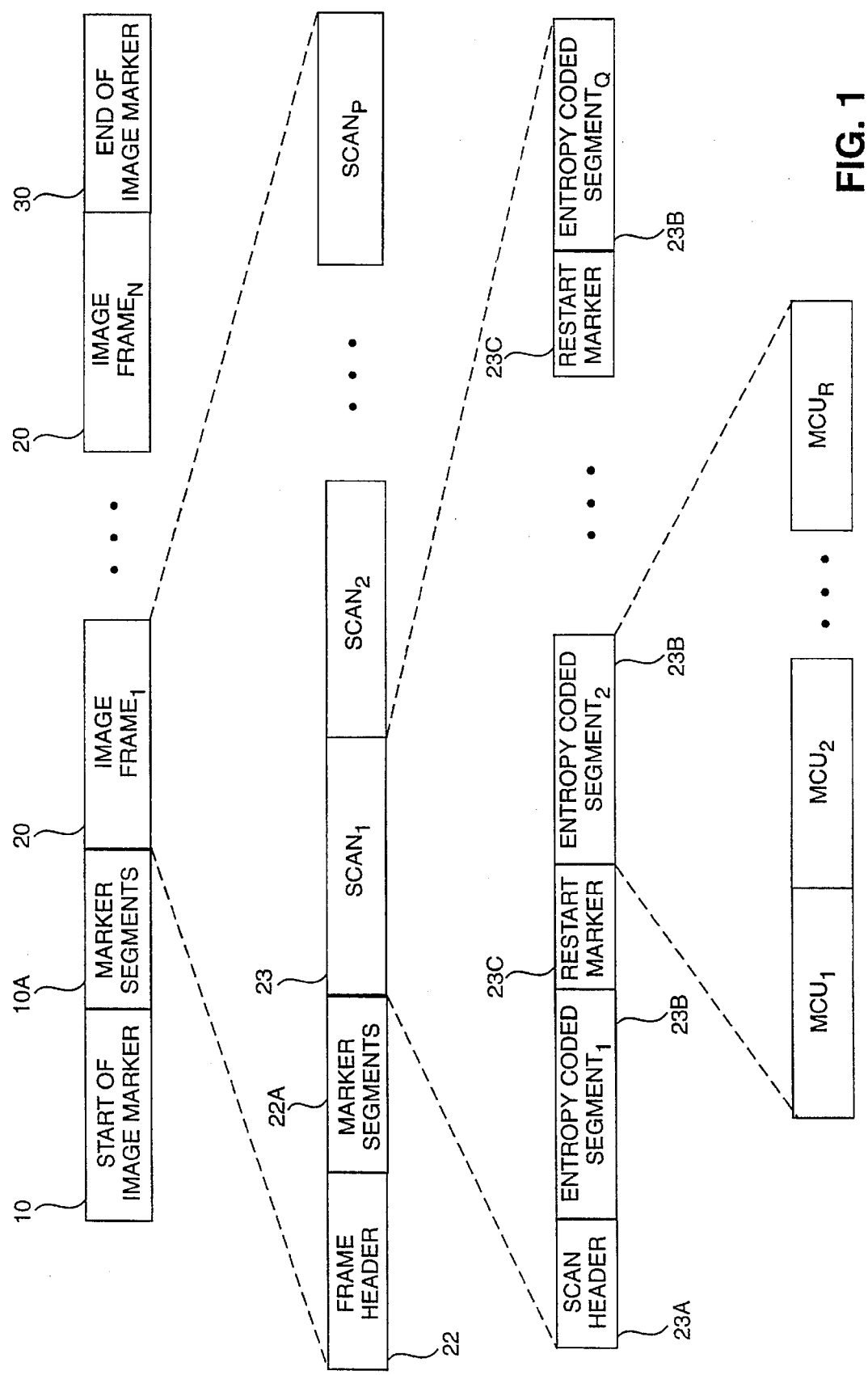
FIG. 1 shows the structure of a typical JPEG compressed image.

FIG. 1 shows the structure of a typical JPEG coded image 50. A start of image marker 10 and marker segments 10A begin one or more image frames 20 (i.e., the compressed image data stream), and an end of image marker 30 terminates the image frame or frames. The marker segments 10A define quantization tables, entropy-coding (transformation) tables, and other miscellaneous parameters.

A frame header 22 and marker segments 22A are generated at the beginning of each image frame 20. The frame header 22 begins with a start of frame marker followed by parameter values needed for decoding the frame. For example, the frame header defines the basic attributes of the image, including image size, number of image components, the mode of compression, and the entropy coder used within the frame. Like the marker segments preceding the image frame, marker segments 22A also define quantization tables, entropy coding (transformation) tables, and other miscellaneous parameters.

Each image frame 20 is composed of one or more scans 23 through the image data, where a scan is a single pass through the data for one or more components of the image. The components of each scan are grouped into one or more entropy coded segments 23B which are separated by restart markers 23C. The components in each entropy coded segment are further grouped into one or more minimum coded units ("MCUs") generally representing 16×16 blocks of the image.

Appended to the beginning of each scan in an image frame 20 is a scan header 23A. The scan header 23A begins with a start of scan marker followed by parameter values needed for decoding the scan, such as the number of components in the scan and the scan component specification.

Marker segments begin with a "marker" which is a two-byte hexadecimal code or word. The first byte is always a byte-aligned 0xff (0x representing that the bytes in the image data stream are in hexadecimal form and the hexadecimal byte ff signifying a marker). The second byte is a "marker code" which identifies the function of the marker segment. The second byte is always a non-zero byte. For example, the start of image marker is 0xffd8 and the end of image marker is 0xffd9. In both cases, the byte ff denotes a marker, and the marker codes d8 and d9 identify the markers as the start of image and end of image markers, respectively.

The tables in FIGS. 2 and 3 list the markers in a JPEG image: the table in FIG. 2 includes the start of frame markers (defining the entropy encoding procedure used), and the table in FIG. 3 includes all of the other, non-start of frame markers. These markers fall into two categories: those without parameters, and those followed by a fixed, undefined, or variable length sequence of parameters.

A "V" notation in the length column of the tables in FIGS. 2 and 3 represents a variable length parameter with a known structure; an "N" notation in the length column represents that no parameter sequence follows the marker; a "U" notation in the length column represents that the parameter sequence is undefined; and a numeric notation in the length column represents a fixed number of parameter bytes following the marker. For example, in FIG. 3 the restart marker 0xffd0 has no parameters; the parameters of the define restart interval marker 0xffdd are contained in the 4 bytes immediately following 0xffdd; and the start of scan marker 0xffda contains a variable-length parameter sequence.

The first parameter in any marker segment is always a two-byte code representing the length of the parameter sequence. For example, a two-byte code 0x0043 following the quantization table marker 0xffdb would represent that there are 67 parameter bytes following the marker, including the two-byte length parameter.

Markers with parameters following them are generally referred to as marker segments but the terms are used interchangeably in this application.

Effect of JPEG Image Transmission Errors

The JPEG image is very sensitive to transmission errors. Applicants have determined that some portions of the JPEG image are more sensitive to transmission errors than others. Specifically, the marker segments have been determined to be more sensitive than the entropy coded segments. And among the marker segments, the restart markers have been determined to be less sensitive than the other markers.

The sensitivity of the JPEG image to transmission errors is illustrated using the first 300 4-byte words of a JPEG image shown in FIGS. 4A-4C. A single bit error in the start of image marker 0xffd8 (Word No. 1) will destroy the image completely, such as, for example, where the start of image marker is converted to an end of image marker 0xffd9. Similarly, a single bit error in the quantization table marker 0xffdb (Word No. 5) will have disastrous results. For example, if a single bit error converts 0xffdb to start of frame marker 0xffcb or 0xffda the entire image will be lost.

As mentioned above, errors in the restart markers will generally not result in loss or severe degradation of the image because there is a restart marker separating each of the entropy coded segments (or portions) of the image. For example, in FIGS. 4A-4C, each entropy coded segment represents only one MCU or 16×16 block of image pixels. If the restart marker 0xffd3 (Word No. 216) in FIG. 4 is changed by one bit to 0xffd2, another restart marker, the JPEG decoder will not decode the 16×16 block of image data (Word Nos. 217–233) following the erroneous marker—but that will not effect the JPEG decoder's ability to decode the rest of the image.

Finally, entropy coded segments are the least sensitive to single bit errors during transmission, and that is because they only represent portions or blocks of the image.

The present invention categorizes the JPEG image data by its relative sensitivity to transmission errors. The marker segments are defined as Type-I information and the entropy coded segments are defined as Type-II information. The Type-I marker segments can be further categorized based on their relative sensitivity to transmission errors. In this regard, because the restart markers are less sensitive to transmission errors than the other markers, they are defined as Type-IB information and the other markers are defined as Type-IA information.

The transmission protocol of the present invention takes into account the sensitivity of each of the different types of information and uses different levels of error protection ("unequal error protection") for the different types of information. The highest protection is applied to the Type-IA information—which has the highest sensitivity to transmission errors. The same or a lesser level of protection is applied to the Type-IB information. Finally, the lowest level of error protection is applied to the Type-II information—the least sensitive of the three types of information.

Applying unequal error protection serves to reduce the overhead or bandwidth (i.e., the number of redundant bits) required for error protection, and thereby increases the throughput of the transmission system and more efficiently uses the communication channel. These advantages can be more fully appreciated by considering the relative contributions of each type of information to the JPEG image. The most important type of information, the Type-IA information, typically takes up less than 1% of the JPEG image data stream, and the Type-IB information typically takes up only 5–10% of the JPEG image data stream. The rest of the JPEG image data stream consists of the least error sensitive Type-II information.

Automotive repeat request (ARQ), forward error correction (FEC), and hybrid ARQ protocols are common error protection protocols for reliable data communication. ARQ protocols use a feedback channel to request retransmission of erroneous data packets and thereby provide a relatively error-free channel. FEC protocols operate without a feedback channel but use powerful channel codes in an attempt to correct the transmission errors at the receiver. In sum, ARQ protocols provide more powerful error protection, but less efficient error protection than FEC protocols. Hybrid ARQ protocols, on the other hand, combine the features of the FEC and ARQ protocols to provide reliable and efficient error protection.

The power of an error protection protocol is usually measured by its minimum "free distance," which is a term known to those of ordinary skill in the art. The greater the free distance of an error protection protocol the more powerful the error protection. Error protection power may also be measured by the average bit error rate (BER) for the same signal-to-noise ratio (SNR), but only if the BER is relatively constant over time. The smaller the BER of an error protection protocol the more powerful the error protection.

Stop and Wait ARQ is one form of ARQ protocol. The transmitter appends parity check bits to the packets of data to be transmitted. The parity check bits enable the receiver to detect errors in the data packets. Many error detection coding techniques are known to those of ordinary skill in the art, including, for example, CRC-16, which is a 16-bit cyclic redundancy error detection code.

Following the transmission of each data packet over a forward communication channel, the transmitter waits for a positive or negative acknowledgement (ACK or NAK) from the receiver. If no error is detected in the data packet, the received data packet is delivered to the data sink and a positive acknowledgement is sent back to the transmitter, which, in response, sends the next data packet to the receiver. If, on the other hand, an error is detected in the received data packet, the receiver discards the data packet and a negative acknowledgement is sent to the transmitter which, in response, re-sends the same data packet.

As mentioned above, the FEC protocols do not use an ARQ feedback channel. The transmitter introduces redundancy into the data stream to allow the receiver to correct errors in the erroneous data packets. FEC codes usually fall into two general categories: (i) block codes and (ii) convolutional codes.

With convolutional codes, the encoder loads the bits from an incoming data stream into a tapped shift register and encodes each bit as it is loaded into the first position in the shift register. The encoding process involves combining the bit to be encoded with certain of the preceding bits in subsequent memory positions using modulo 2 addition.

The power of a convolutional code is determined by the "rate" and "memory" of the code. The "rate" is the number of bits output from the encoder for each bit input to the encoder. For example, a rate ½ convolutional encoder outputs two bits for every bit input to the encoder. The "memory" determines how many of the preceding bits are used in encoding the current data bit; if four preceding bits in the data stream are used, the memory for the convolutional code is 4. In sum, the higher the rate and/or the larger the memory, the more powerful the convolutional code.

A block code, in contrast to a convolutional code, encodes blocks of bits rather than individual bits. The size of the tapped shift register for a block encoder is determined by the size of the block of bits to be encoded.

A repetition code is one form of block code. Repetition codes send multiple copies of the same data packet. The error protection power of the repetition code increases with the number of copies of the packet that are sent.

Finally, Hybrid ARQ schemes use an ARQ protocol with a FEC code to detect and correct errors. In one hybrid ARQ, an erroneous data packet is re-sent only if it cannot be corrected by the FEC code. In another type of Hybrid ARQ scheme, the initial transmission is coded for error detection only and parity bits for error correction are transmitted only when necessary. The error protection power of a hybrid ARQ would typically fall some where between the error protection power of pure ARQ protocols and that of powerful FEC protocols.

Those of ordinary skill in the art will understand from the above discussion that there are numerous ways to embody the unequal error protection of the present invention. The chosen embodiment for a particular application depends, among other things, on the bit error rate (BER) of the wire or wireless communication medium and the acceptable BER for the information being transmitted.

For example, when a feedback channel is available, a relatively error free ARQ protocol may be used to transmit the Type-I information, without any error protection for the Type-II information which can handle the $10^{-4}$ BER often associated with a wireless medium. Alternatively, a less powerful FEC code may be used for the Type-II information.

If no ARQ feedback channel is available, a repetition type FEC code may be used for the Type-I information with no error protection for the Type-II information. Alternatively, one non-repetition FEC code (e.g., a convolutional code with rate ⅓ and memory 4) may be used for the Type-I information and another, less powerful non-repetition FEC code (e.g., a convolutional code with rate ½ and memory 4) may be used for the Type-II information.

Other embodiments may use a hybrid ARQ feedback channel. In these embodiments a FEC code may be used in an attempt to correct the Type-I information first before using the ARQ feedback channel to request re-transmission.

Additional embodiments of the present invention may also use the above unequal error protection schemes to separately protect the Type-IA and Type-IB information.

Still further embodiments of the present invention incorporate novel antenna diversity techniques from a Weerackody patent and other Weerackody patent applications for transmitting JPEG images over slow fading wireless channels.

Other illustrative embodiments of the present invention are presented at the end of this application for a storage system for JPEG images.

For clarity of explanation, the illustrative embodiments of the present invention set forth below are presented as functional blocks. The functions these blocks represent may be implemented with shared or dedicated hardware, including, but not limited to, hardware capable of executing software. Illustrative embodiments may comprise digital signal processor hardware, such as the AT&T DSP16 or DSP32C, and software performing the operations discussed below. Very large scale integration (VLSI) hardware embodiments of the present invention, as well as hybrid DSP/VLSI embodiments, may also be provided.

Illustrative Embodiments with ARQ Feedback

Figure 5A:
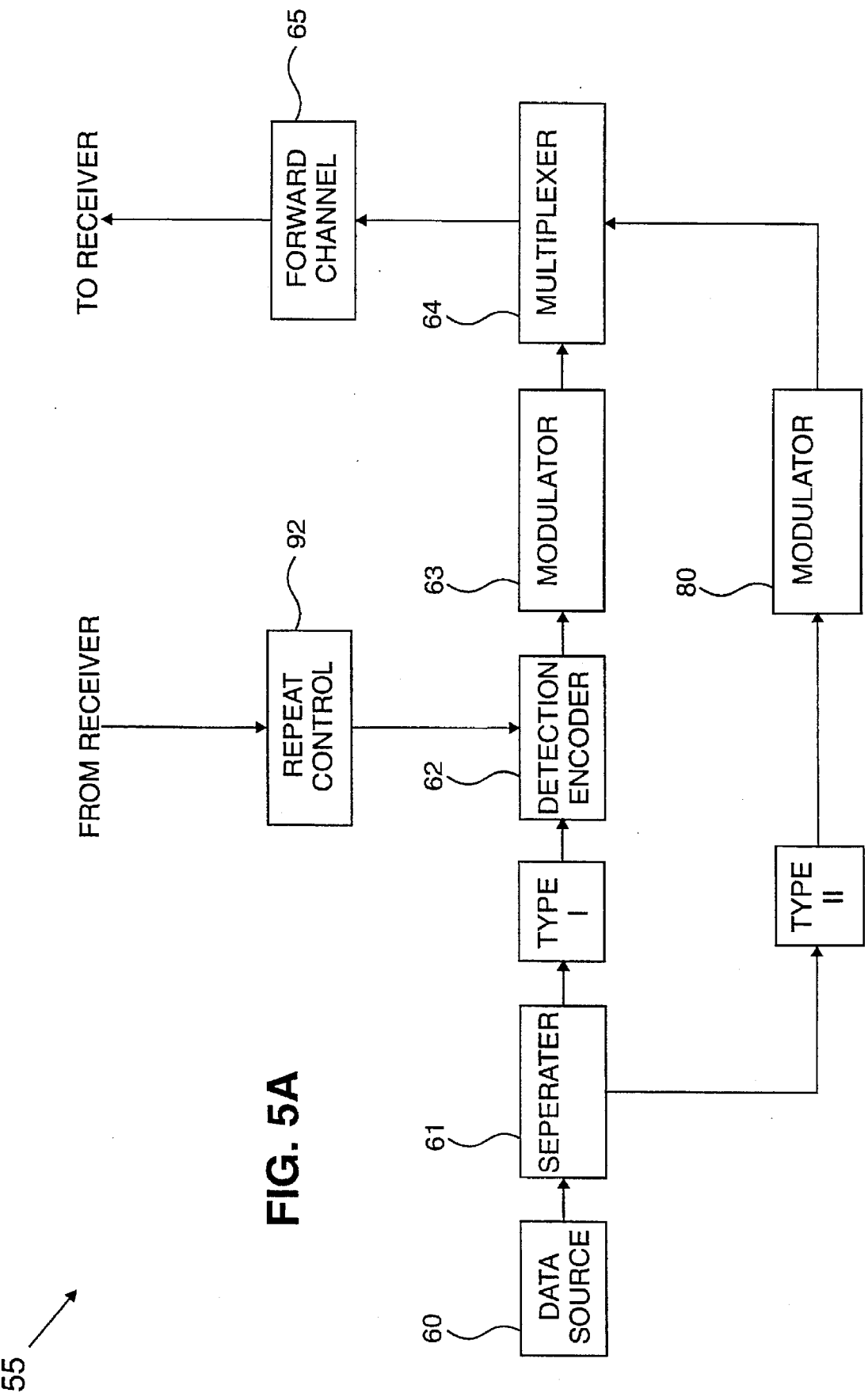

An illustrative embodiment of the present invention is shown in FIGS. 5A and 5B. This embodiment of the present invention uses a Stop and Wait ARQ protocol for the Type-I information and no error protection for the Type-II information. It will be readily apparent to one of ordinary skill in the art that other embodiments may use other ARQ protocols (such as Selective-Repeat ARQ and Go-back-N ARQ) for the Type-I information and a less powerful FEC or ARQ protocol for the Type-II information.

FIG. 5A shows a transmitter 55 and FIG. 5B shows a receiver 56 according to the present invention. The transmitter in FIG. 5A comprises a separator 61, an error detection encoder 62, modulators 63 and 80, a multiplexer 64, and a repeat controller 92. For wireless applications, the transmitter may also include one or more antennas and associated transmission circuits.

The receiver 56 in FIG. 5B comprises a demultiplexer 66, demodulators 67 and 81, a decoder 68, a combiner 69, and a repeat generator 90.

Figure 6A:
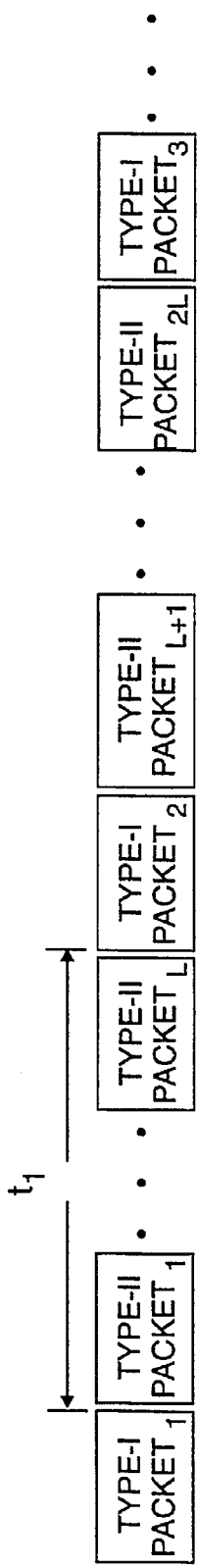
FIGS. 6A–6C illustrate multiplexed Type-I and Type-II information packets of a JPEG image transmitted using the present invention.
Figure 6B:
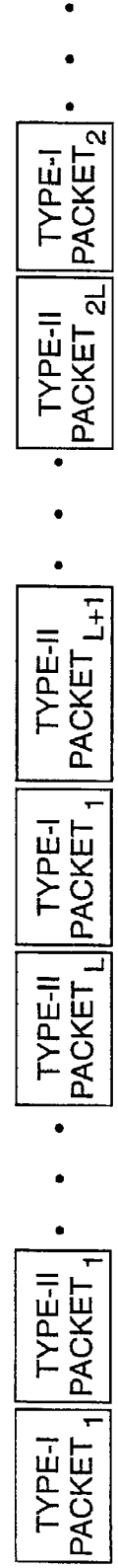

In general, the transmitter in FIG. 5A receives a JPEG image from data source 60, such as, for example, a JPEG encoder and transmits the JPEG image over the forward channel 65 to the receiver 56 in FIG. 5B. The forward channel 65 can be a wire or wireless communication medium. The transmitter sends the JPEG image over the forward channel 65 in packets as illustrated in FIGS. 6A and 6B.

At the receiver, the JPEG image information packets are processed and, if no errors are detected, they are transferred to the data sink 70, which may be, for example a JPEG decoder. If an error is detected in any of the data packets a request for retransmission is sent by repeat generator 90 to transmitter 55 over the feedback channel 91 shown in FIG. 5B. Like the forward channel, the feedback channel may be a wire or wireless communication medium.

In more detail, a separator 61 according to the present invention separates the most sensitive Type-I JPEG information from the less sensitive Type-II information, as discussed above. The separator 62 may be, for example, a digital signal processor (DSP) with suitable software for separating the JPEG image into Type-I and Type-II information, or further into Type-IA, Type-IB, and Type-II information.

The following is one example of how a DSP may be programmed to separate the Type-I information from the Type-II information for a single frame, single scan JPEG image. Other methods not discussed below will be readily apparent to those of ordinary skill in the art for JPEG images having one or more frames 20 and one or more scans 23.

The DSP in this example examines the incoming bytes of the JPEG image for the hexadecimal byte ff, which denotes a marker. If an ff byte is detected, the DSP examines the next byte in the data stream, namely the marker code which describes the function of the marker. The purpose here is to determine whether the marker also includes a segment of parameters which will follow the marker in the data stream.

For example, if the next byte is hexadecimal d8, the DSP knows that the marker is a start of image marker which has no parameters, as shown in the table in FIG. 3. In this case, the DSP separates the entire two-byte marker (ffd8) from the JPEG stream.

If, however, the next byte is hexadecimal db, the DSP knows that the marker is a define quantization table marker (ffdb) which has a variable length sequence of parameters following it in the data stream. As discussed above, markers with parameters following them are usually called marker segments.

In the case of a marker segment, the DSP examines the next two bytes in the data stream after the two-byte marker to determine the number of parameter bytes following the marker. The DSP then separates the two-byte marker and its parameter bytes from the JPEG data stream.

If a byte is not determined to be a marker or marker segment it is considered Type-II entropy coded information and sorted as such from the JPEG data stream.

In addition to separating the Type-I information from the Type-II information, the DSP also appends certain position information to the Type-I information so that the JPEG image structure can be re-created at the receiver. Various ways of doing this for one or more image frames 20, and one or more scans 23, will be readily apparent to those of ordinary skill in the art.

For example, as shown in FIG. 1, in a typical single frame, single scan JPEG image, all of the Type-I markers and marker segments occur before the Type-II entropy coded segments, with the exception of the Type-I restart markers and the end of image marker. Therefore, in a typical single frame, single scan JPEG image, only the positions of the end of image marker and restart markers need to be forwarded to the receiver.

One way the DSP can code the positions of the end of image marker and the restart markers is to keep a running count of the number of bytes in the JPEG data stream and use the byte number of the first restart marker (ffd0) as the starting position for the modulo 8 sequence of restart markers. For example, if the first restart marker (ffd0) is the 300th byte in the data stream, then its byte number is 300.

Once the byte number of the first restart marker is determined, the DSP can identify the relative byte positions of the remaining restart markers in the modulo 8 sequence (ffd1-ffd7). Specifically, the DSP may assign a byte number to each subsequent restart marker which corresponds to the number of entropy coded bytes between it and the previous restart marker.

With respect to the end of image marker, the DSP may identify its position by its byte number in the data stream. If there are 400 bytes in the JPEG image, then the position of the end of image marker will be 400.

In an alternative embodiment, the positions of the Type-IB restart markers are transmitted to the receiver without the restart markers themselves. This is because the restart markers occur in a known predetermined pattern (modulo 8 sequence: 0xffd0, 0xffd1, 0xffd2, 0xffd3, 0xffd4, 0xffd5, 0xffd6, and 0xffd7) which can be generated at the receiver.

Continuing with the detailed explanation of the transmitter 55 in FIG. 5A, once separated from the Type-II information, the Type-I information is encoded by an error detection encoder 62. The encoder forms Type-I information packets using error detection coding techniques known to those of ordinary skill in the art. A suitable error detection encoder for wire or wireless applications is a CRC-16 encoder which appends a 16-bit error detection code to the Type-I information packets.

The encoded Type-I information packets are then modulated by the modulator 63 for transmission over forward channel 65. Any suitable modulator may be used, such as, for example, a 4-DPSK modulator.

The Type-II information packets are not coded in this illustrative embodiment. The Type-II information packets are passed along a separate transmitter channel to a second modulator 80 where they are modulated for transmission over forward channel 65. As will be explained in more detail below, the Type-II information packets may be coded using a less powerful FEC coding technique, if desired or needed for a particular application.

The modulated Type-I and Type-II information packets may also be multiplexed over the forward channel by multiplexer 64. The purpose behind multiplexing the Type-I and Type-II information is to take advantage of the time slots ($t_1$ in FIG. 6A) left idle after each Type-I packet transmission, during which the transmitter waits for a positive or negative acknowledgement from the receiver. FIG. 6A shows one example of a flow of multiplexed Type-I and Type-II information packets over a communication medium.

Figure 6C:

In FIG. 6A, the multiplexer multiplexes L Type-II information packets in between Type-I information packets. L can be fixed or variable. In addition, more than one Type-I packet can be transmitted after each group of L Type-II packets, as shown in FIG. 6C.

It will be readily apparent to those of ordinary skill in the art that a single encoding channel may be used for transmitter 55. It will also be readily apparent to those of ordinary skill in the art that the placement of the multiplexer 64 in transmitter 55 is only illustrative. For example, the multiplexer 64 may be placed in advance of the modulation so that a single modulator may be used for both the Type-I and Type-II information as shown in FIG. 7G.

Continuing with the packet flow, the multiplexed Type-I and Type-II information packets travel over the forward channel 65 to a complementary receiver 56 in FIG. 5B for processing. The demultiplexer 66 in FIG. 5B serves to direct the multiplexed Type-I and Type-II information packets along separate channels in the receiver 56 for processing by circuitry associated with the type of error protection each type of information is afforded.

The Type-I information packets are then demodulated by demodulator 67. Any suitable demodulator may be used, such as, for example, a 4-DPSK demodulator. A suitable error detection decoder is a CRC-16 decoder.

Once demodulated, the Type-I information packets are decoded by error detection decoder 68. Among other things, decoder 68 functions to re-calculate the error detection code for each information packet and compare it to the error detection code transmitted with the Type-I information packet. If the two codes match, presumably there is no error in the transmitted packet. If the two codes do not match, there is at least one error in the transmitted packet.

If an error is found, the packet is normally discarded, and a request to re-send the packet is sent over the feedback channel 91 by the repeat generator 90 in the form of a negative acknowledgement (NAK). The repeat controller 92 shown in FIG. 5A responds to this request by re-sending the same packet. Each packet may be stored before transmission in a buffer or other suitable memory device. For purposes of illustration, the packet stream in FIG. 6B shows the same Type-I information packet (packet 1) being resent.

If no error is found, the Type-I information packet is forwarded to combiner 69, and this time a positive acknowledgement (ACK) is sent by the repeat generator 90 over the feedback channel to the transmitter 55. In response to the positive acknowledgement, the repeat controller 92 sends the next data packet, as illustrated in FIG. 6A.

Turning to the Type-II information packets, they are also demodulated, but by demodulator 81. Because the Type-II information packets in this example of the present invention have not been encoded with any error detection or correction code, they are sent directly to the combiner 69 after being demodulated.

The combiner 69 combines the Type-I and Type-II information packets into a structure suitable for the data sink 70, which normally will be the JPEG structure shown in FIG. 1. The combiner 69 may be a digital signal processor (DSP) which is programmed to combine the Type-I and Type-II information.

For example, the DSP may be programmed to place the first restart marker and the end of image marker at their respective byte number positions in the data stream. Each of the other restart markers is placed at a byte position relative to the preceding restart marker. As discussed above, the relative position of each restart marker was coded by separator 62 as the number of Type-II information bytes after the preceding restart marker. Finally, if only the positions of the restart markers are sent, the DSP may also be further programmed to generate the modulo 8 sequence of restart markers at the coded relative byte positions.

In another illustrative embodiment of the present invention the transmitter 55 and receiver 56 in FIGS. 5A and 5B, respectively, are modified to include an error correction encoder-decoder pair 78, 83 for encoding the Type-II information with a suitable, less powerful FEC code, such as, for example, a rate ½, memory 4 convolutional FEC code. In addition, a block interleaver-deinterleaver pair 79, 82 is also included. This embodiment is shown in FIGS. 5C and 5D.

Figure 5C:
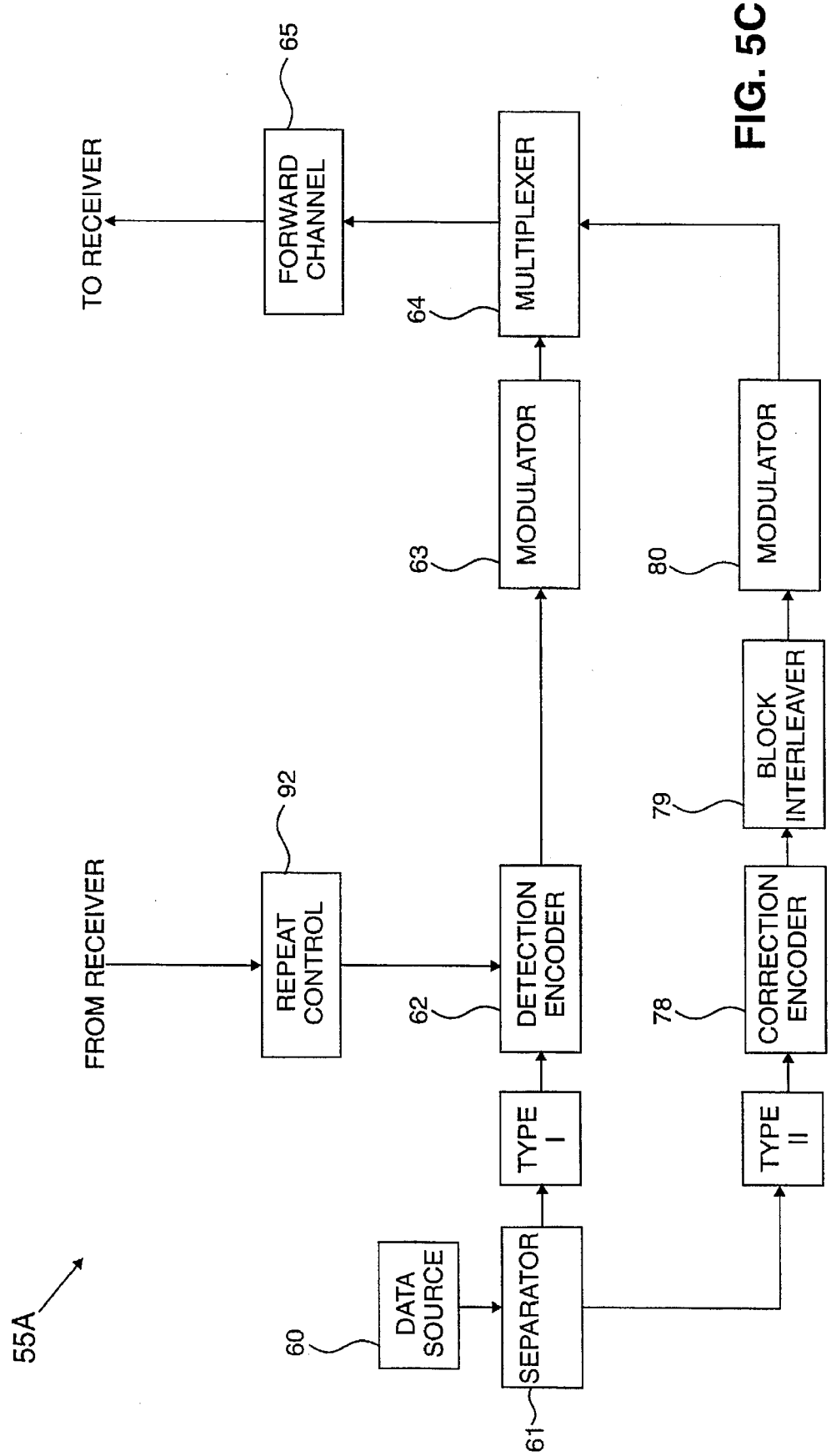
Figure 5D:
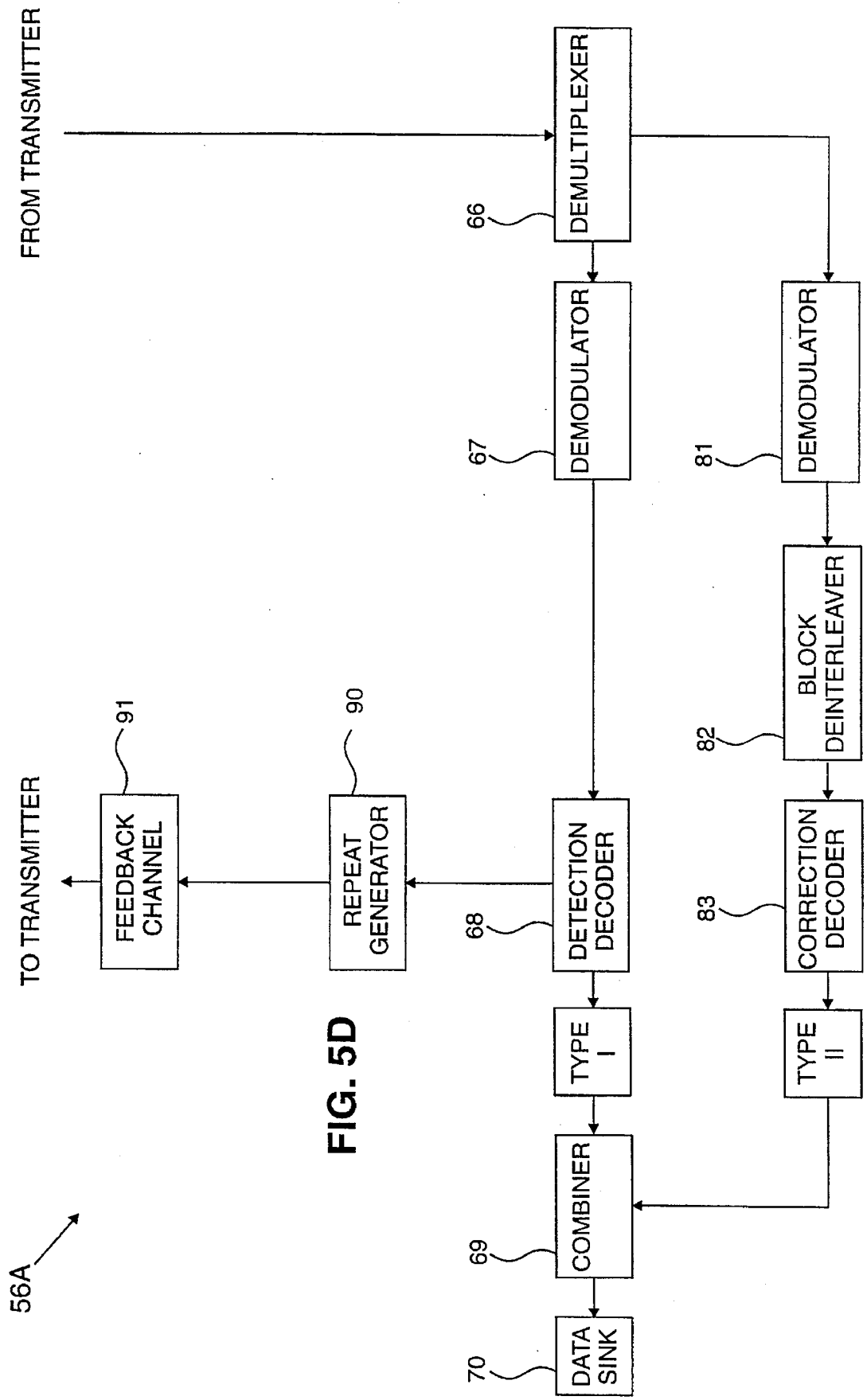

A transmitter 55A is shown in FIG. 5C. As discussed above, the transmitter 55A is basically the same as the transmitter 55 in the FIG. 5A embodiment, with the exception of error correction encoder 78 and block interleaver 79, which have been added to the Type-II channel.

The error correction encoder 78 (otherwise known to those of skill in the art as a channel encoder or channel coder) encodes the Type-II information with a rate ½, memory 4 convolutional code to improve the signal transmission performance of the Type-II information packets.

The block interleaver 79 writes the bits of each encoded Type-I packet into an m×n memory matrix in a column-wise fashion and reads the bits out row-wise. Therefore, if a burst error of length n were to occur, the interleaver would function to effectively convert the burst error into single bit errors, which are much easier to correct. In sum, the interleaver serves to randomize the burst errors, which is especially helpful on slow fading wireless channels.

A receiver 56A is shown in FIG. 5D. As discussed above, the receiver 56A is the same as the receiver 56 shown in FIG. 5B, with the exception of de-interleaver 82 and error correction decoder 83.

The de-interleaver 82 performs the inverse operation of the interleaver 79. The bits from the incoming Type-II information packets are stored row-wise in an m×n memory matrix and read out column-wise.

The error correction decoder 83 in this embodiment will normally use the Viterbi algorithm with soft decisions to decode the received Type-II information, but other algorithms known to those of ordinary skill in the art may also be used.

Figure 5E:
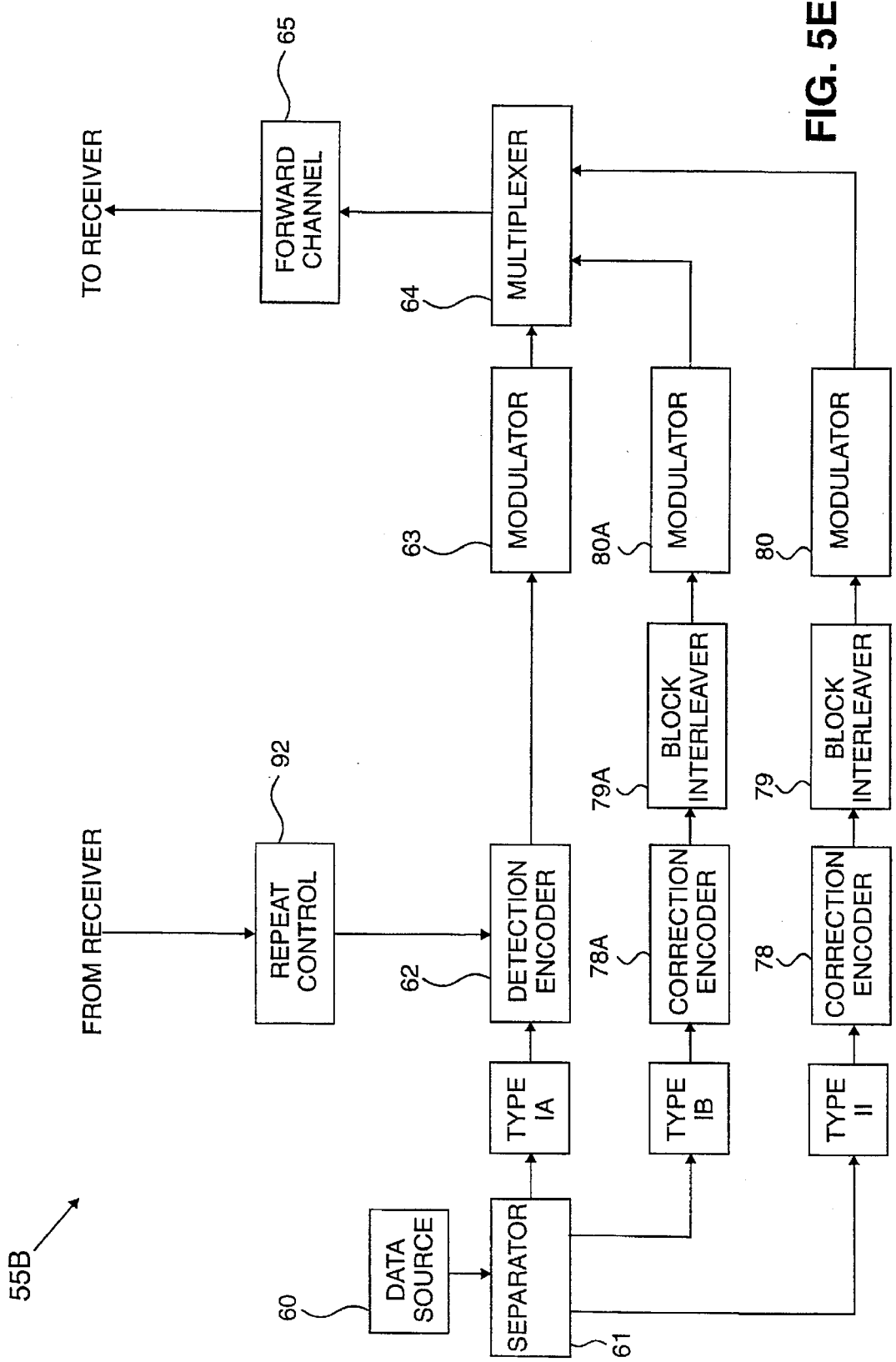
Figure 5F:
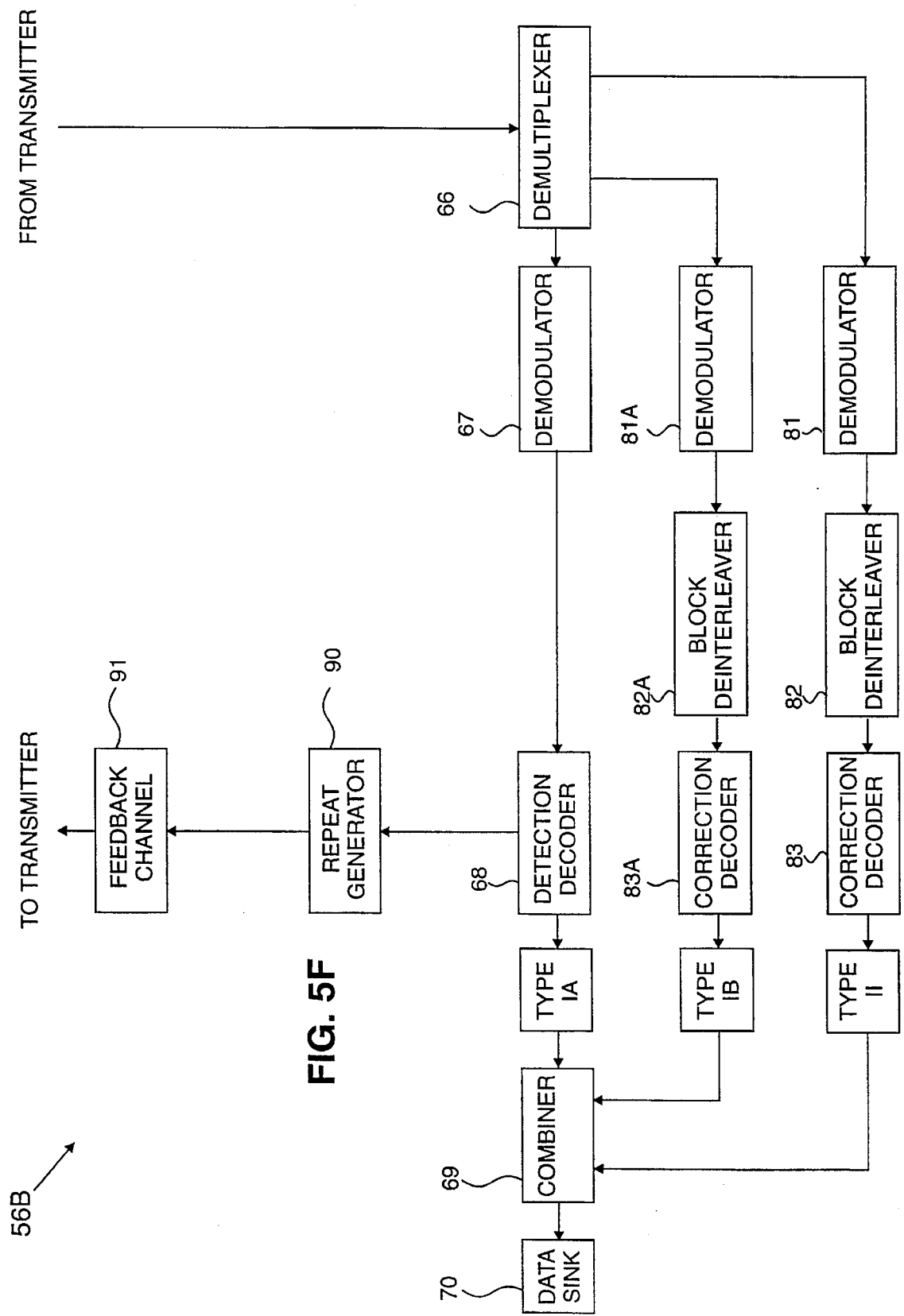

In still another alternative embodiment of the present invention using ARQ feedback, the Type-I information is separated into Type-IA and Type-IB information and the Type-IA information is provided with more powerful error protection than the Type-IB information. An example of such an embodiment is shown in FIGS. 5E and 5F.

In this embodiment, the separator functions to separate the JPEG image into Type-IA, Type-IB, and Type-II information, and the combiner functions to combine all three types of information into a JPEG structure suitable for the data sink 70.

In this embodiment, the separator DSP may be programmed to further separate the Type-I information into Type-IA and Type-IB information. For example, the DSP may separate or sort the restart markers from the other Type-I markers using the second byte of each marker which identifies its function. As shown in the table in FIG. 2, if the byte after the ff byte is d0–d7, the marker is a restart marker and the DSP will separate it from JPEG data stream as Type-IB information. Position information may be coded by the separator as already described.

The combiner DSP, in turn, may combine all three types of information in the manner described above.

As shown in FIG. 5E, the transmitter 55A of FIG. 5C, (now transmitter 55B) has been modified to include an additional encoding channel for processing the Type-IB information. The Type-IA information is still processed along the same ARQ-based channel as the Type-I information in FIGS. 5A and 5C. The Type-IB channel of transmitter 55B includes an error correction encoder 78A, a block interleaver 79A, and a modulator 80A, corresponding to the encoder 78, block interleaver 79, and modulator 80 described in FIG. 5C for the Type-II information. Moreover, by way of example only, error correction encoder 78A uses the same less powerful, convolutional code as used by encoder 78 for the Type-II information, namely a rate ½, memory 4 convolutional code.

As shown in FIG. 5F, the receiver 56A of FIG. 5D, (now receiver 56B) has been modified to include a separate decoding channel for the Type-IB information, with the Type-IA information still being decoded on the same Type-I channel shown in FIGS. 5B and 5D. Specifically, the Type-IB channel includes a demodulator 81A, a block de-interleaver 82A, and an error correction decoder 83A. The decoding process for the Type-IB information is the same as the decoding process used for the Type-II information because the same convolutional code was used for both the Type-IB and Type-II information in this illustrative embodiment. As mentioned above, the decoding process normally uses the Viterbi algorithm.

Illustrative FEC Embodiments Without ARQ Feedback

Figure 7A:
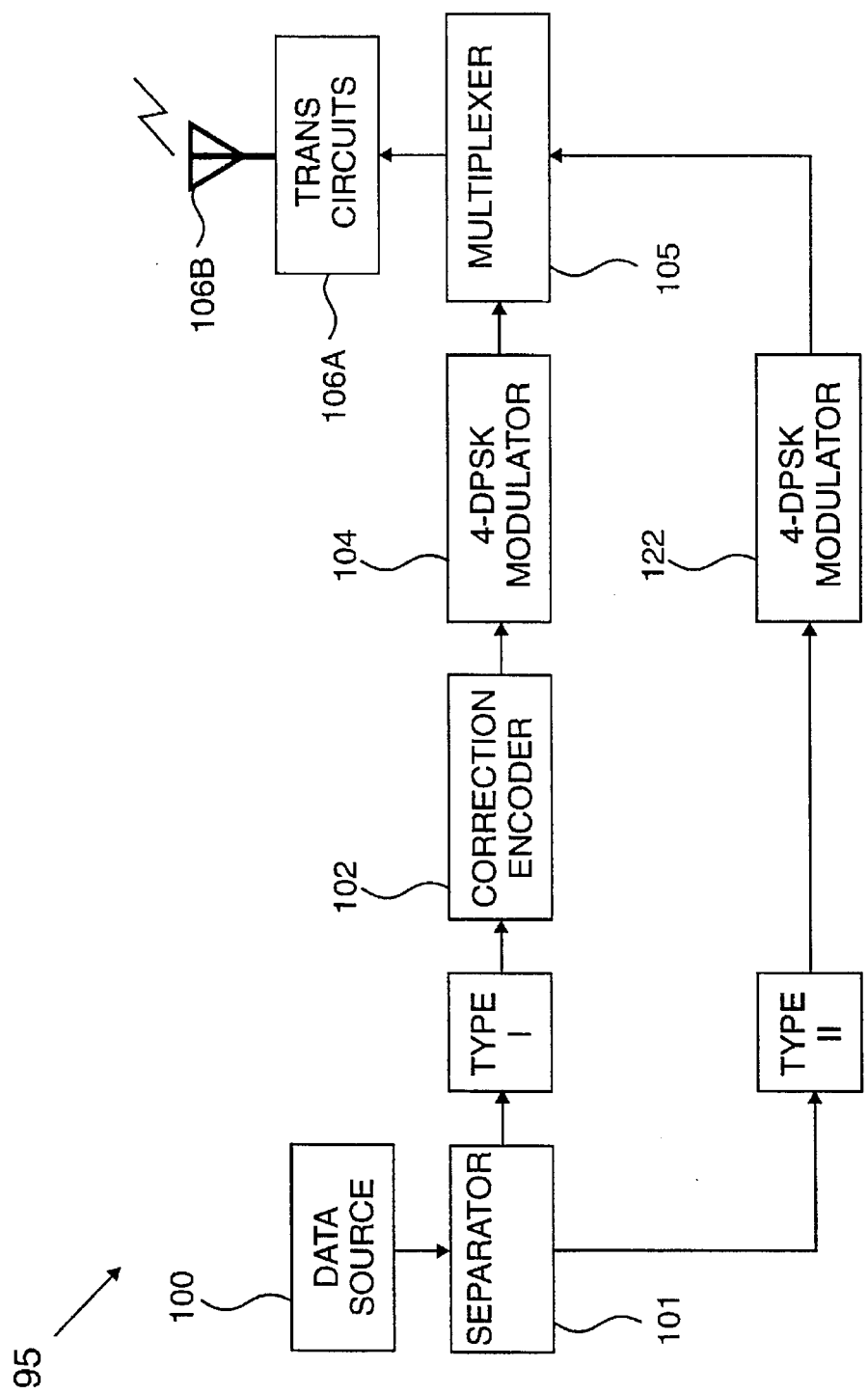
FIGS. 7A–7I show illustrative FEC embodiments of the present invention without an ARQ feedback channel.
Figure 7B:
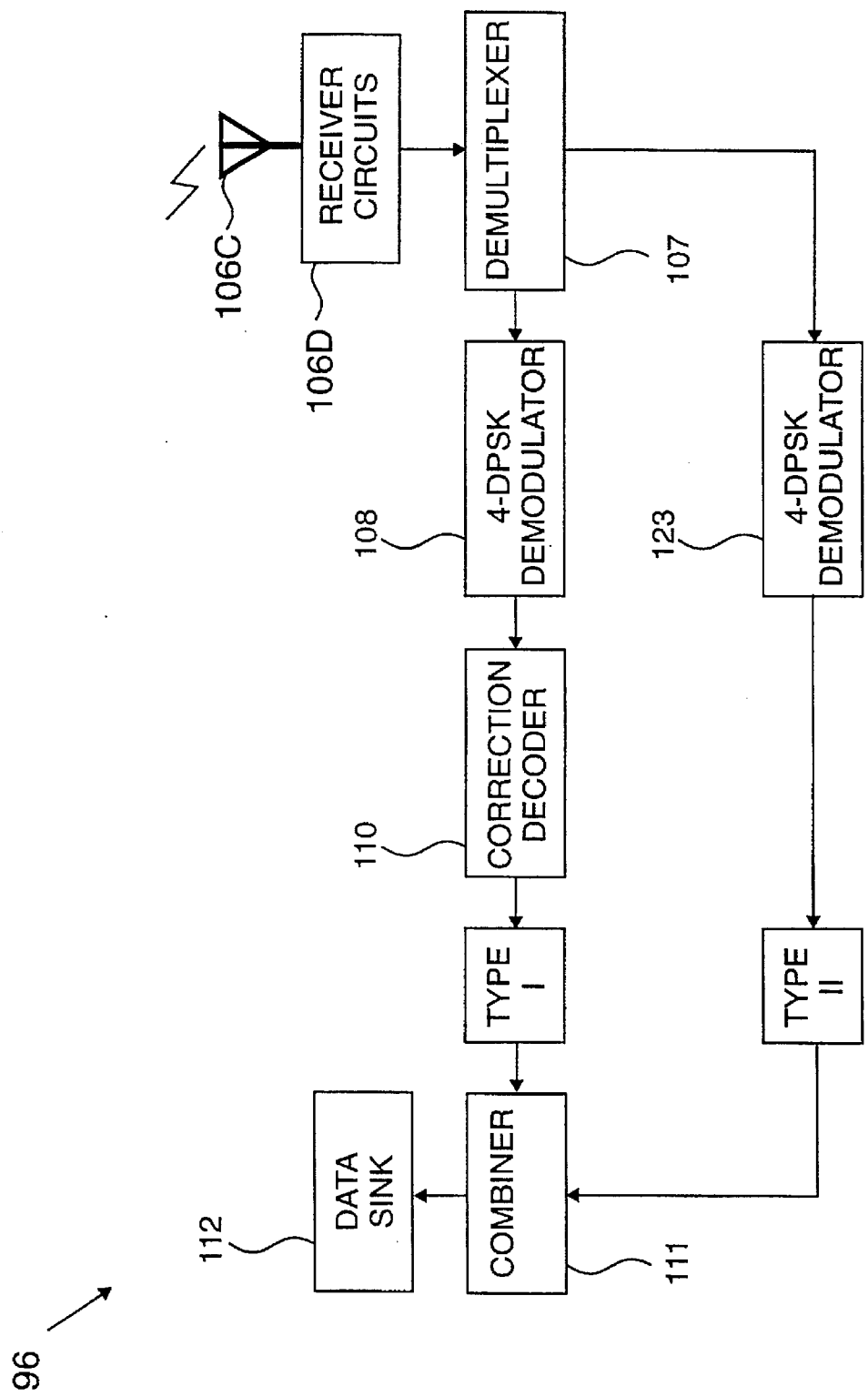

FIGS. 7A and 7B show one illustrative embodiment of the present invention which does not use an ARQ protocol for the Type-I information packets. This illustrative embodiment uses a simple repetition-type FEC protocol instead. There is no feedback channel in this embodiment for re-transmitting an erroneous Type-I information packet. Moreover, this embodiment of the present invention is adapted for use in a wireless environment, but it will be understood by those of ordinary skill in the art that this embodiment can be readily adapted for use in a wire environment.

FIG. 7A shows a transmitter 95 suitable for use with this embodiment and FIG. 7B shows a receiver 96 suitable for receiving and processing JPEG information packets transmitted using a repetition protocol.

The transmitter 95 in FIG. 7A includes, by way of example only, a separator 101, an error correction encoder 102, a 4-DPSK modulator 104, a 4-DPSK modulator 122, a multiplexer 105, transmission circuitry 106A (comprising conventional carrier, pulse-shaping, and power amplification circuitry), and an antenna 106B.

The receiver 96 shown in FIG. 7B includes, by way of example, an antenna 106C, conventional front-end receiver circuits 106D (comprising, for example, low noise amplifiers, RF/IF band-pass filters, and a match filter), demultiplexer 107, and 4-DPSK demodulator 108.

In this embodiment, each Type-I packet is sent K times, giving rise to a 1/K repetition type code, where K is a predetermined number. The Type-II information packets, on the other hand, are only transmitted once, giving rise to unequal error protection for the Type-I and Type-II information packets, with more powerful error protection being provided for the Type-I information packets than the Type-II information packets.

A JPEG image is input from the data source 100 to the separator module 101 which separates the JPEG information into Type-I and Type-II information. A predetermined number of copies (K copies) of each Type-I information packet are formed by the error correction encoder 102. The encoded Type-I information packets are modulated by the 4-DPSK modulator 104 for transmission over a wireless communication medium by way of transmission circuits 106A and antenna 106B.

As mentioned above, the Type-II information packets are not protected against errors. Rather, the Type II information packets are modulated as is by the second 4-DPSK modulator 122 and multiplexed with the modulated Type-I information packets by multiplexer 105.

The multiplexed Type-I and Type-II information packets are then transmitted across the wireless medium to receiver 96 via transmission circuit 106A and antenna 106B. FIG. 6B shows the multiplexed Type-I and Type-II information packets associated with a repetition code calling for two copies of each Type-I information packet. In this embodiment, L (fixed or variable) Type-II information packets are transmitted between one or more Type-I information packets, providing some limited time diversity.

Antenna 106C and receiver circuits 106D in receiver 96 capture the multiplexed Type-I and Type-II information packets. Once received, the Type-I and Type-II information packets are demultiplexed for processing along separate channels, although one of ordinary skill in the art will understand that other embodiments may use only a single decoding channel.

The Type-I information packets are de-modulated by the first de-modulator 108 and stored in a buffer or other suitable memory device for combining by the correction decoder 110. Any suitable algorithm for combining the K copies of each Type-I information packet may be used.

As for the Type-II information packets in this embodiment, they are also de-modulated, but by a second 4-DPSK de-modulator 123, after which, they are transmitted directly to combiner 111 to be combined with the Type-I information packets for the purpose of formatting the Type-I and Type-II information packets with a JPEG structure suitable for data sink 112.

An alternative embodiment may include, for example, the error correction encoder-decoder pair 78, 83 shown in FIGS. 5C and 5D to encode the Type-II information with a less powerful non-repetition FEC code, such as the rate ½, memory 4 convolutional code mentioned above. In this embodiment, the Type-I information may be coded, for example, with a more powerful non-repetition FEC code, such as a rate ⅓, memory 4 convolutional code. The interleaver-deinterleaver pair 79, 82 shown for the Type-II information in FIGS. 5C and 5D may also be used for the Type-I information channel in the transmitter and receiver, respectively.

Figure 7C:
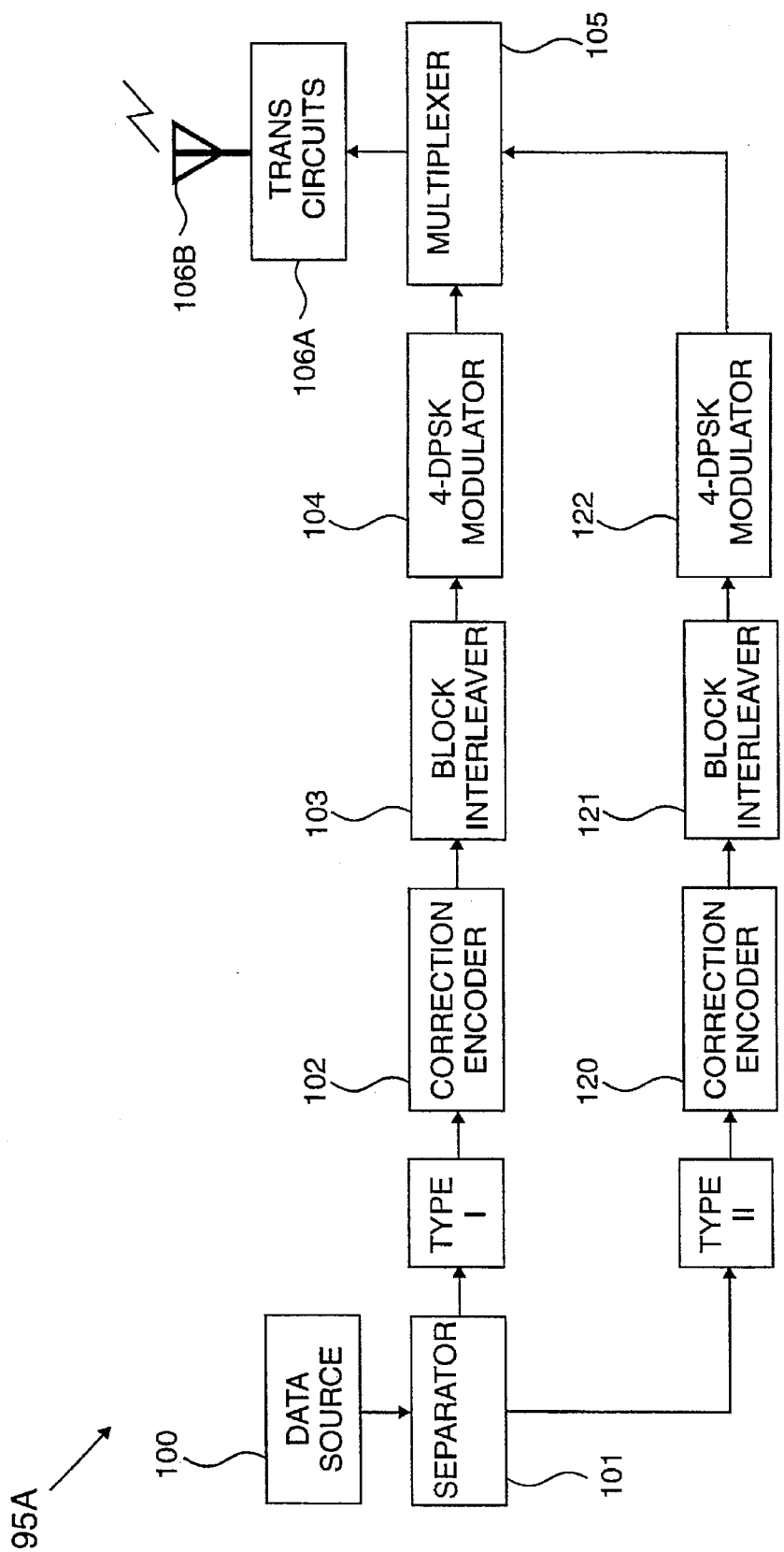
Figure 7D:
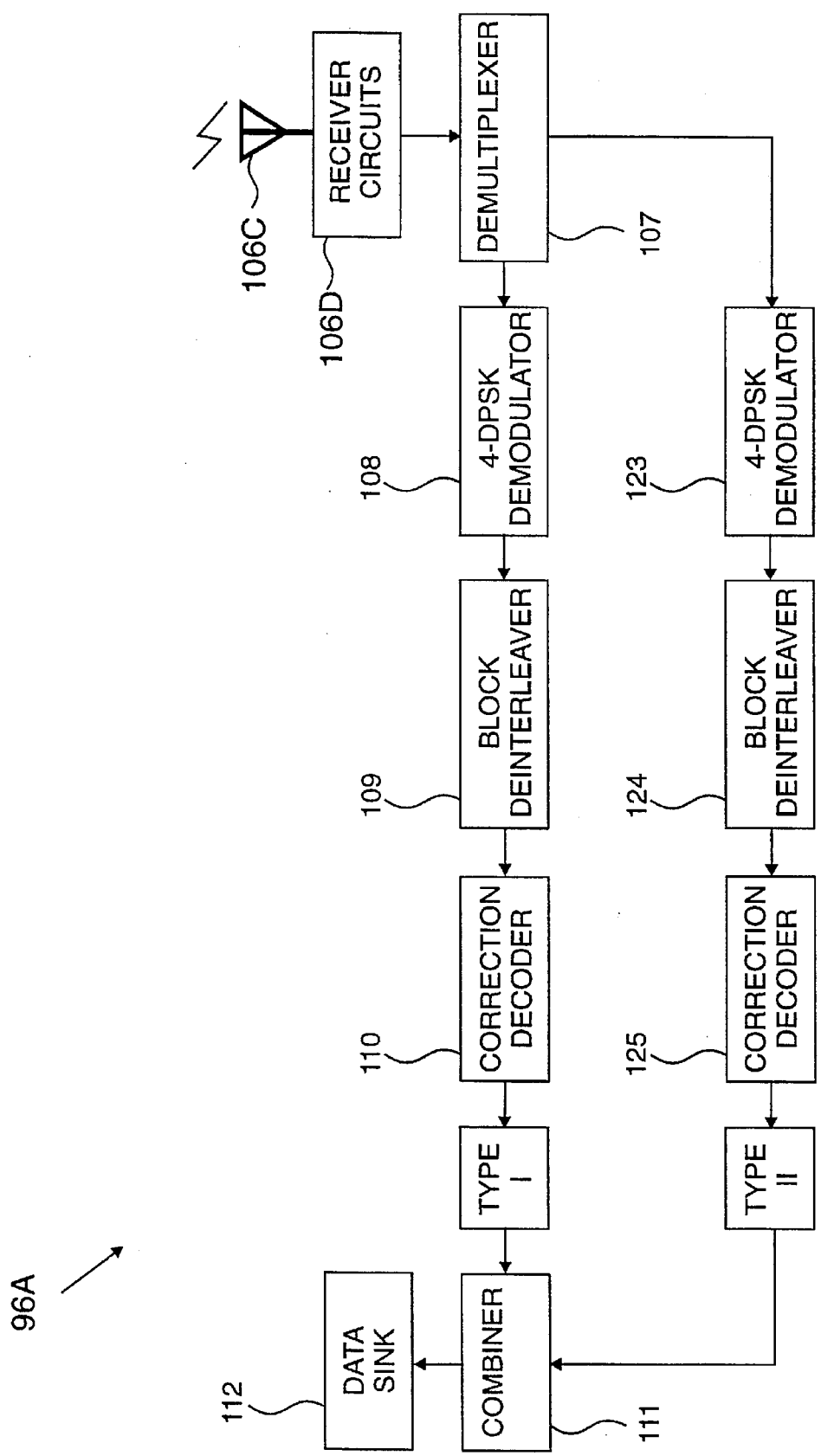

This alternative embodiment is shown in FIGS. 7C and 7D. FIG. 7C shows a transmitter 95A and FIG. 7D shows a receiver 96A according to the present invention. The transmitter 95A in this illustrative embodiment includes an error correction encoder 120 for encoding the Type-II information packets with one convolutional code and an error correction encoder 102 for encoding the Type-I information packets with another, more powerful convolutional code or other error correction code. In addition, the transmitter 95A also includes block interleavers 103 and 121 for interleaving the encoded Type-I and Type-II information packets, respectively.

The components in receiver 96A of FIG. 7D for reversing the encoding and interleaving of the Type-I and Type-II packets are the error correction decoders 110 and 125 and the block deinterleavers 109 and 124.

Figure 7E:
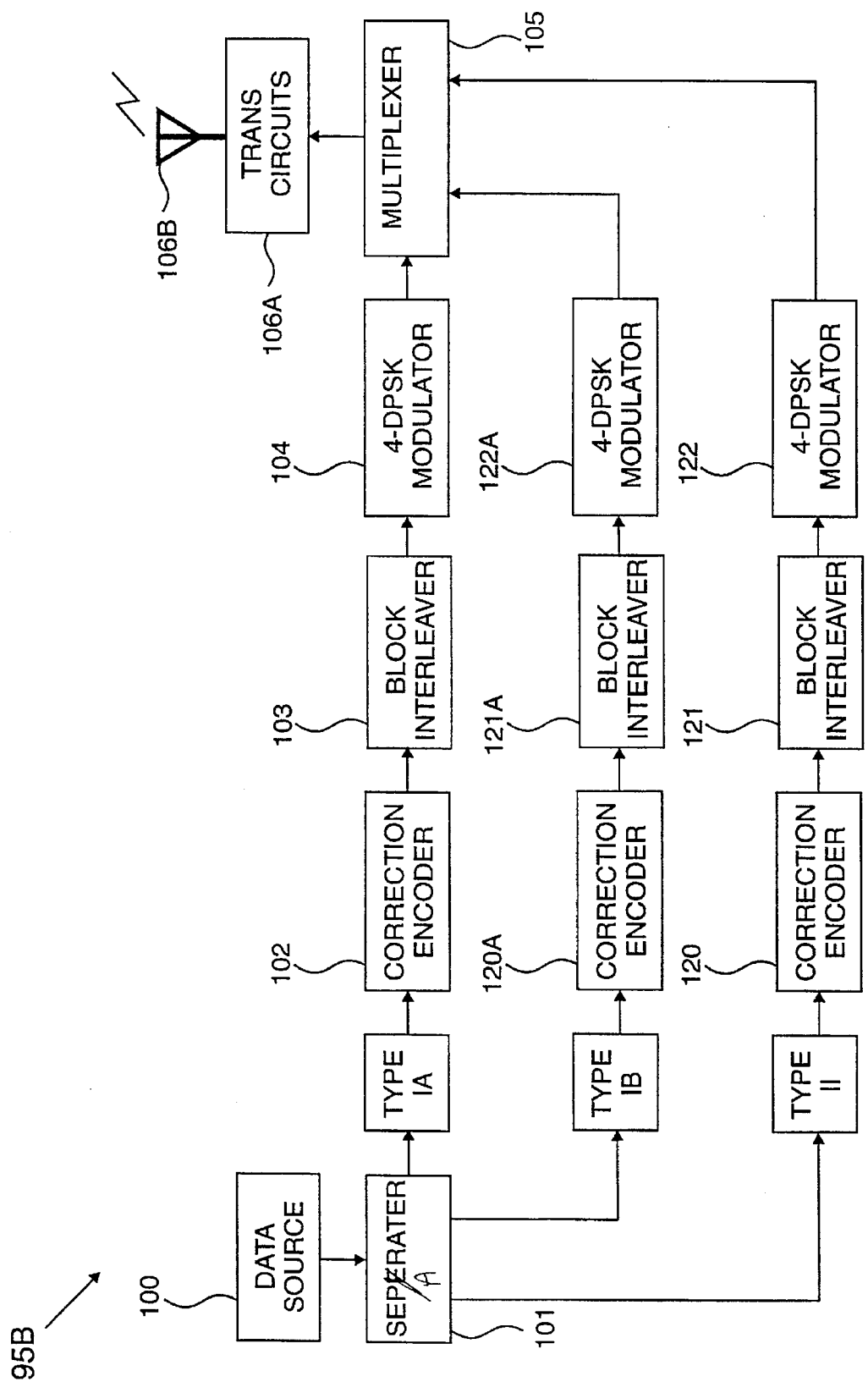
Figure 7F:
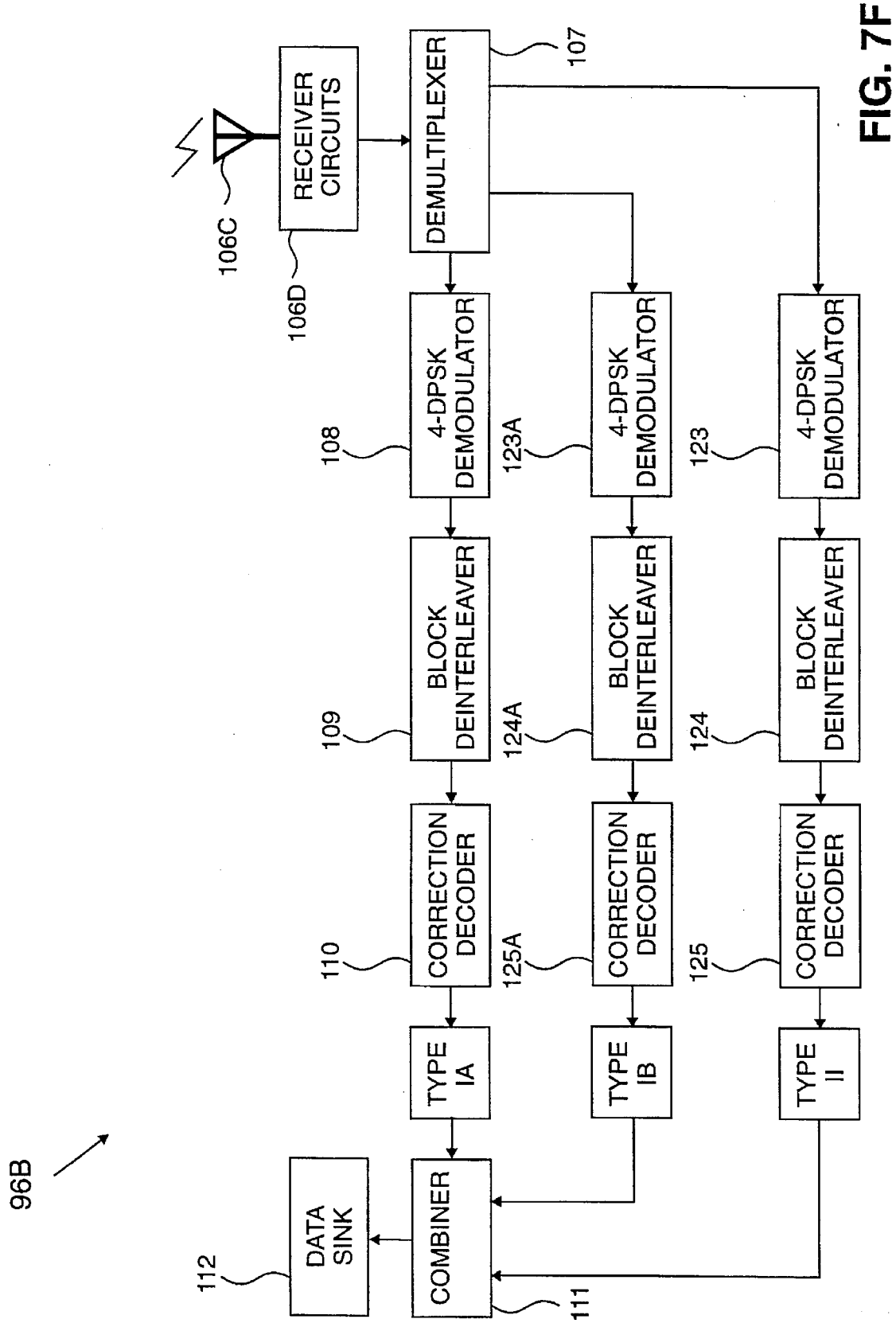
Figure 7G:
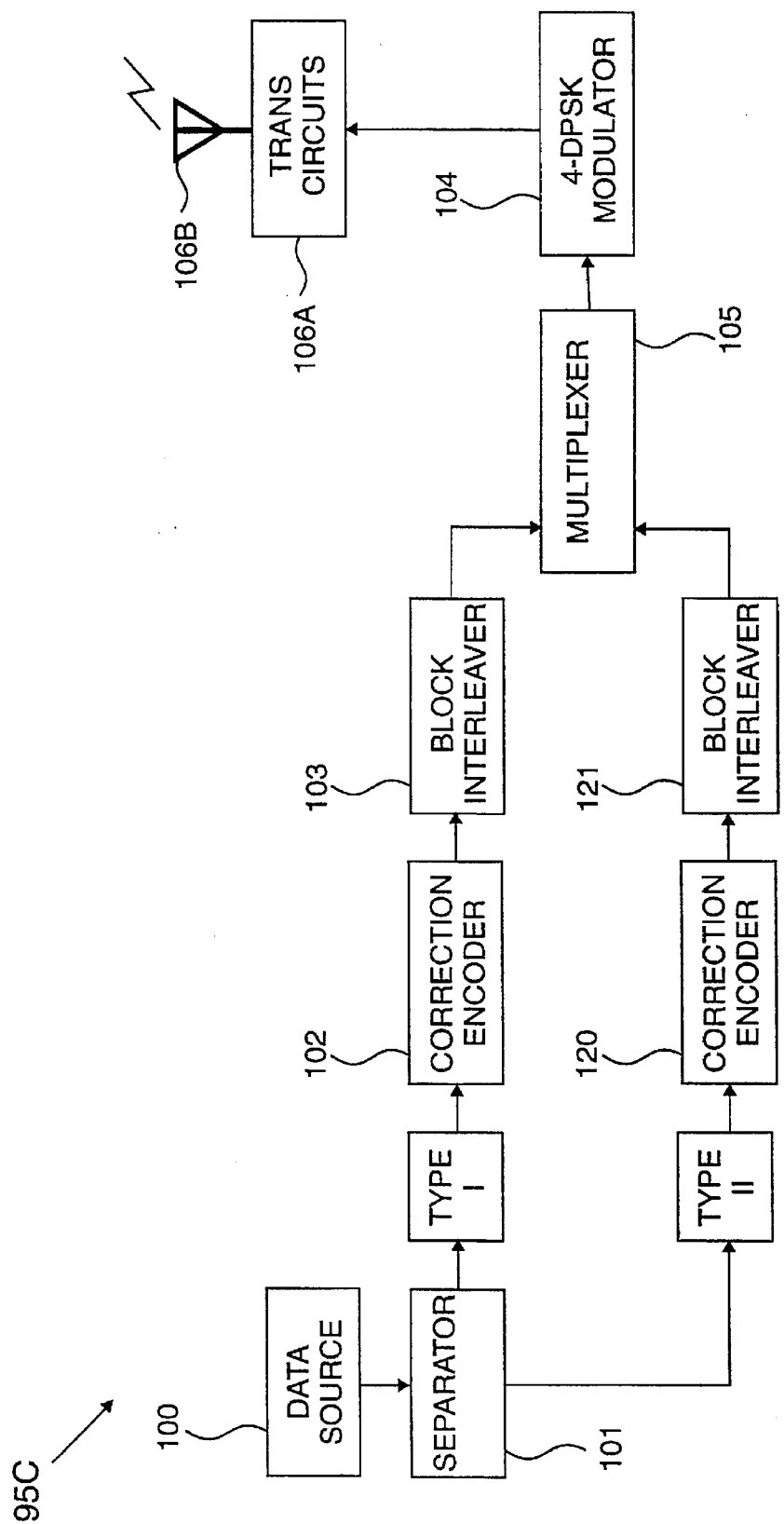

A still further embodiment of the present invention without an ARQ feedback channel is shown in FIGS. 7E and 7F. A transmitter 95B is shown in FIG. 7E and a receiver 96B is shown in FIG. 7F. This embodiment is a modification of the receiver and transmitter shown in FIGS. 7C and 7D, respectively.

As shown in FIGS. 7E and 7F, this embodiment further separates the Type-I information into Type-IA and Type-IB information and includes an additional encoding channel and decoding channel for the Type-IB information. Specifically, transmitter 95B in FIG. 7E includes an additional error correction encoder 120A, block interleaver 121A, and 4-DPSK modulator 122A for the Type-IB information. The receiver 96B, in turn, includes an additional error correction decoder 125A, block deinterleaver 124A, and 4-DPSK demodulator 123A.

By way of example only, the Type-IB information is encoded with the same code as the Type-II information, namely a rate ½, memory 4 convolutional code, and the Type-IA information is still encoded with the more powerful rate ⅓, memory 5 convolutional code. Alternatively, the Type-IB and Type-II information may also be encoded with unequal error protection, with the Type-IB information encoded with more powerful error protection than the Type-II information.

For purposes of illustration, in another embodiment, the present invention multiplexes the Type-I and Type-II information packets in advance of modulation. And on the receiving end, the Type-I and Type-II information packets are demodulated before being demultiplexed.

Figure 7H:
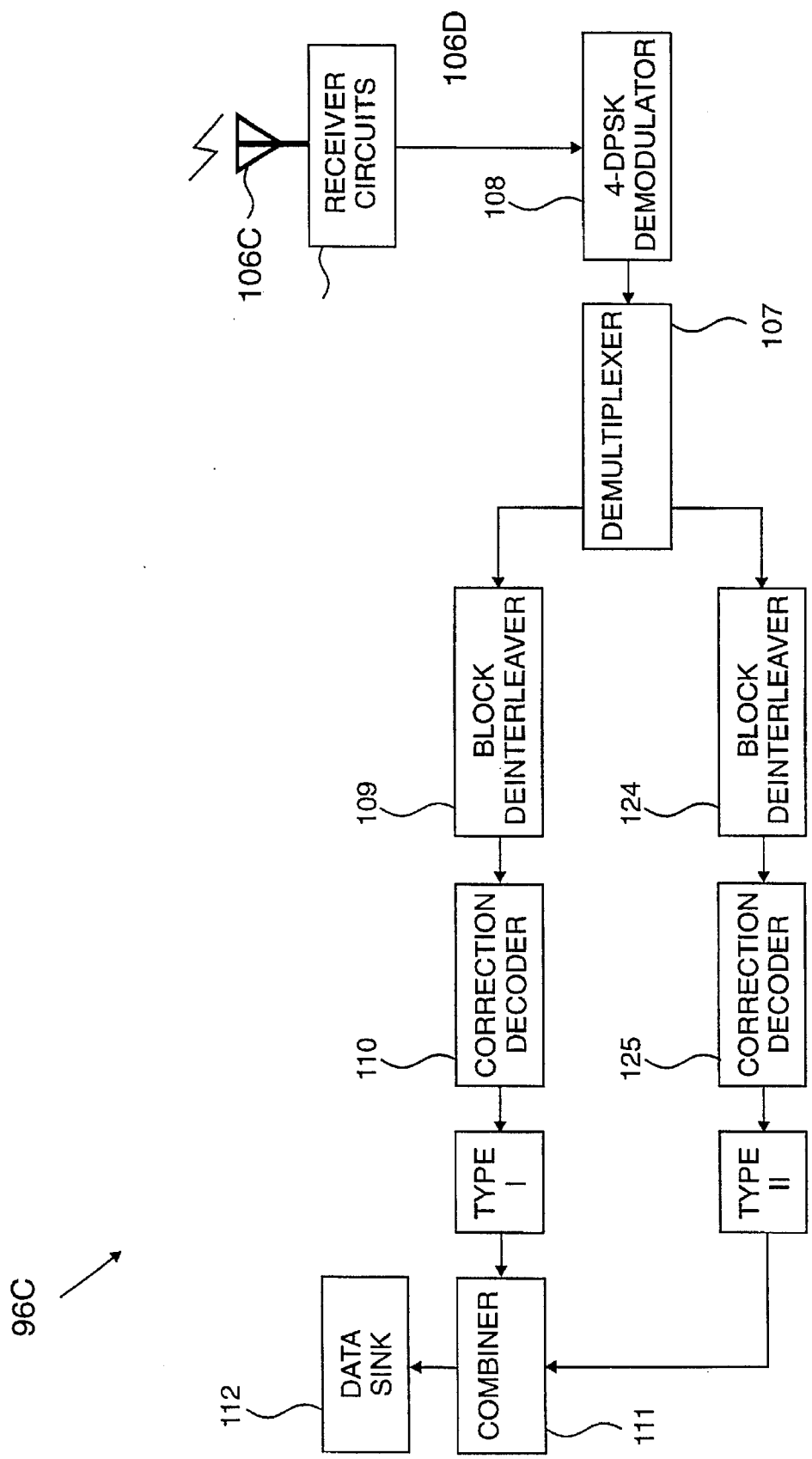

This embodiment is shown in FIGS. 7G and 7H. A transmitter 95C is shown in FIG. 7G and a receiver 96C is shown in FIG. 7H. The transmitter 95C is a modification of the transmitter 95A shown in FIG. 7C. As shown in FIG. 7G, the multiplexer 105 of FIG. 7C has been placed in advance of any modulation, and only modulator 104 is used to modulate the multiplexed Type-I and Type-II information packets.

A complementary receiver 96C is shown in FIG. 7H. Receiver 96C is a modification of the receiver 96A in FIG. 7D. As shown in FIG. 7H, the receiver 96A of FIG. 7D has been modified to place the demultiplexer 107 after the demodulation of the Type-I and Type-II information packets. Moreover, only demodulator 108 remains for demodulating the interleaved Type-I and Type-II information packets.

Illustrative Marker Detection Embodiment

Although not mentioned above, transmission errors may convert Type-II information into markers, which may result in loss of the entire image, such as in situations where Type-II information is converted to a start of image marker (0xffd8) or end of image marker (0xffd9). To solve this problem, a further embodiment of the present invention includes a marker detector for detecting the presence of markers in the Type-II information.

Figure 7I:
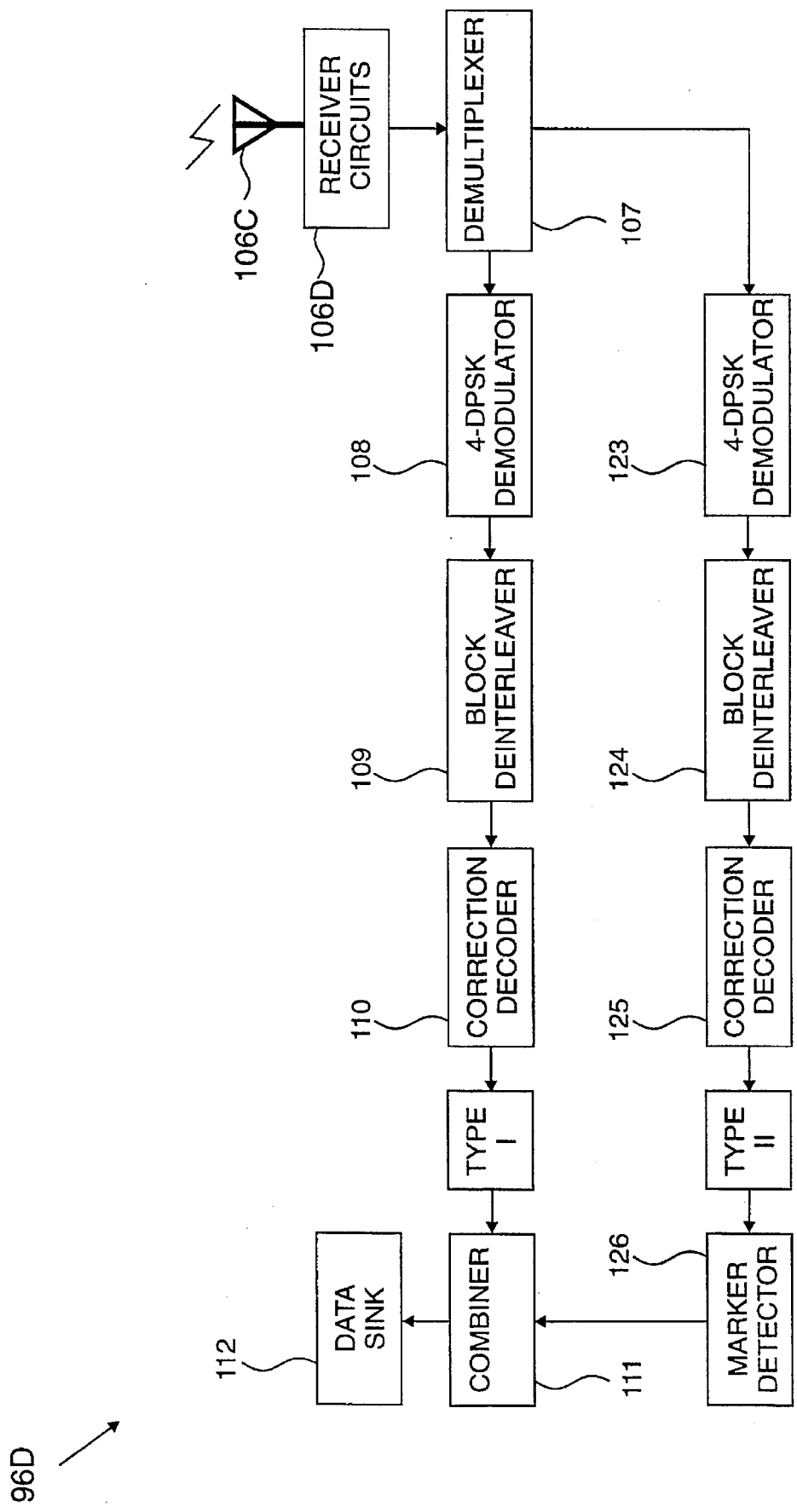

This illustrative embodiment of the present invention is shown in FIG. 7I. The receiver 96D shown in FIG. 7I is a further modification of the receiver 96A shown in FIG. 7D. The receiver 96A in FIG. 7D has been modified in this embodiment to include a marker detector 126 in the Type-II decoding channel. The marker detector 126 examines the Type-II information packets for Type-I markers or marker segments. If a marker is found, at least one f in the marker may be replaced by a random bit pattern so that the JPEG decoder (data sink 112) does not detect an erroneous marker in the Type-II information.

Illustrative Embodiment with Hybrid ARQ Feedback

Figure 8A:
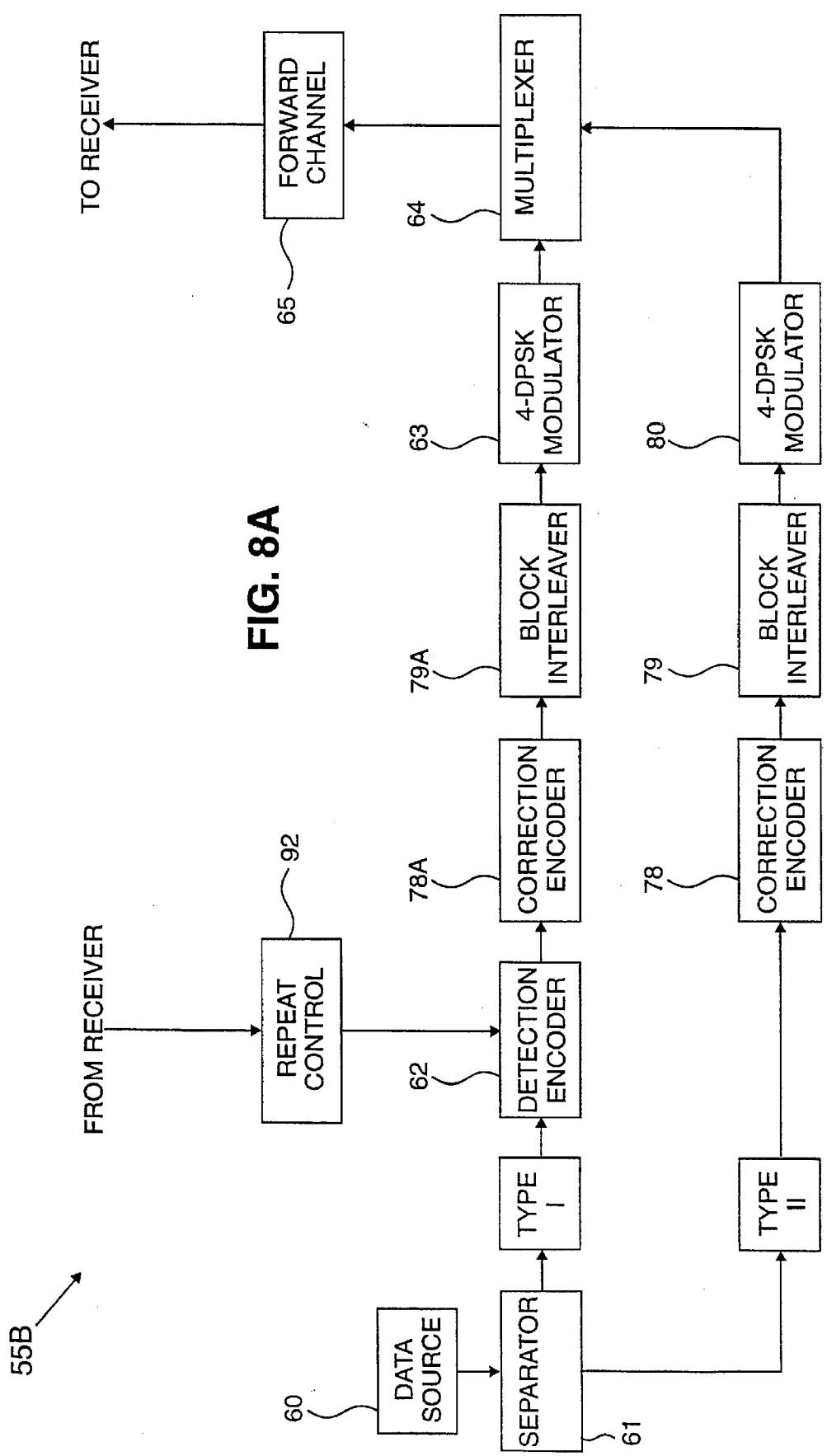
FIGS. 8A–8C show illustrative embodiments of the present invention using a hybrid ARQ feedback channel.
Figure 8B:
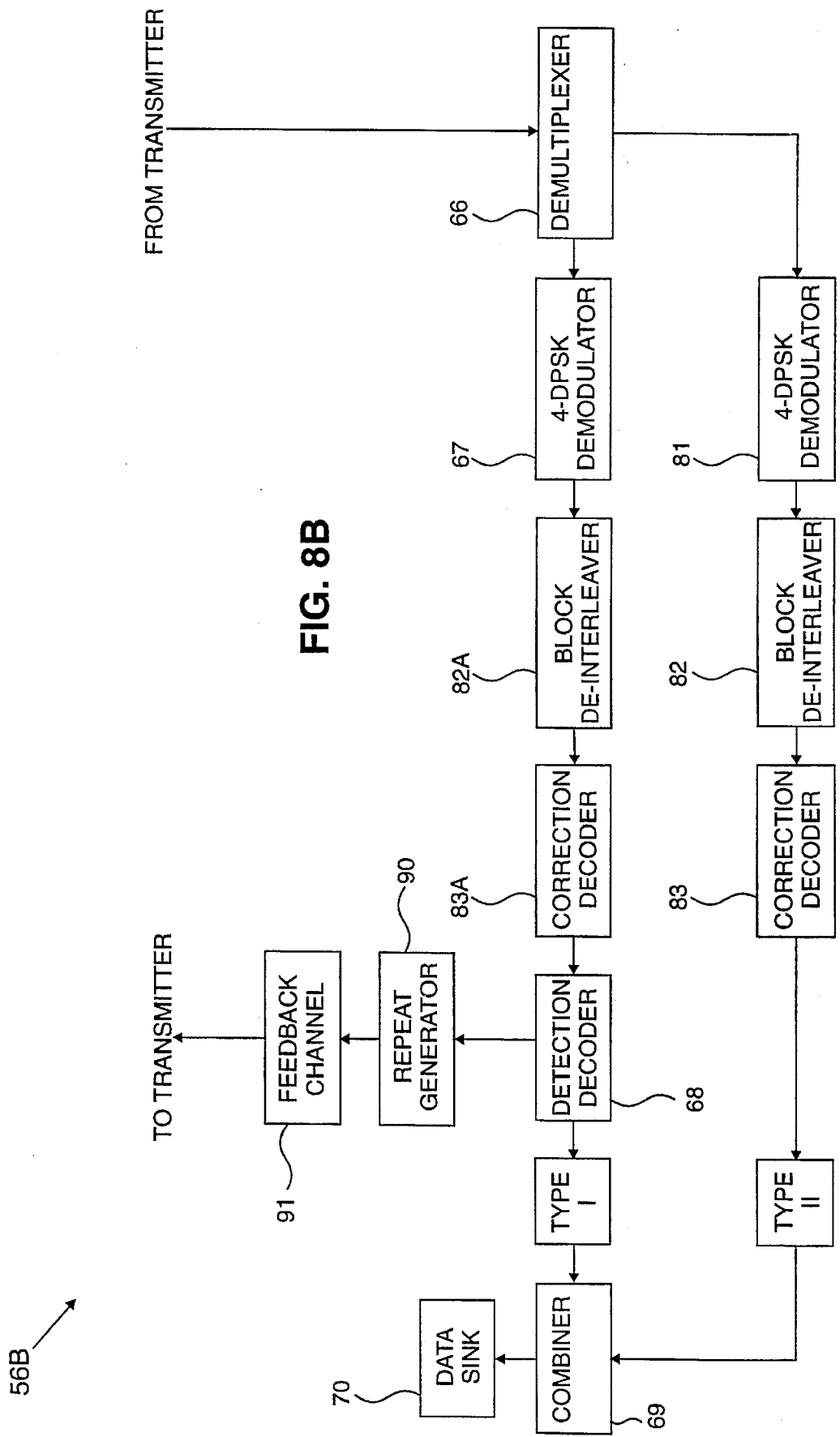

An illustrative embodiment of the present invention using a Hybrid ARQ protocol is shown in FIGS. 8A and 8B. FIG. 8A shows a transmitter 55B and FIG. 8B shows a receiver 56B. This embodiment is a modification of the ARQ embodiment shown in FIGS. 5C and 5D. In this embodiment, an error correction encoder 78A and a block interleaver 79A are added to the Type-I encoding channel of transmitter 55A. In addition, a corresponding error correction decoder 83A and a block deinterleaver 82A are added to the Type-I decoding channel of receiver 56B.

The error correction encoder 78A in transmitter 55B of FIG. 8A further encodes the Type-I information packets with an error correction code in addition to an error detection code. The error correction decoder 83A in receiver 56B of FIG. 8B decodes the error correction code first before the error detection code is used. This way, only in situations where there are errors in the Type-I information packets which the error correction decoder cannot correct, will a request for retransmission be sent by the repeat generator 90 to transmitter 55B.

In this embodiment, the error correction code provided by encoder 83A for the Type-I information need not be more powerful than the error correction code provided by encoder 83 for the Type-II information. The Type-I information is provided with more powerful error protection as a result of the ARQ feedback channel anyway. For example, both the Type-I and Type-II information may be provided with the same rate ½, memory 4 convolutional code.

Figure 8C:
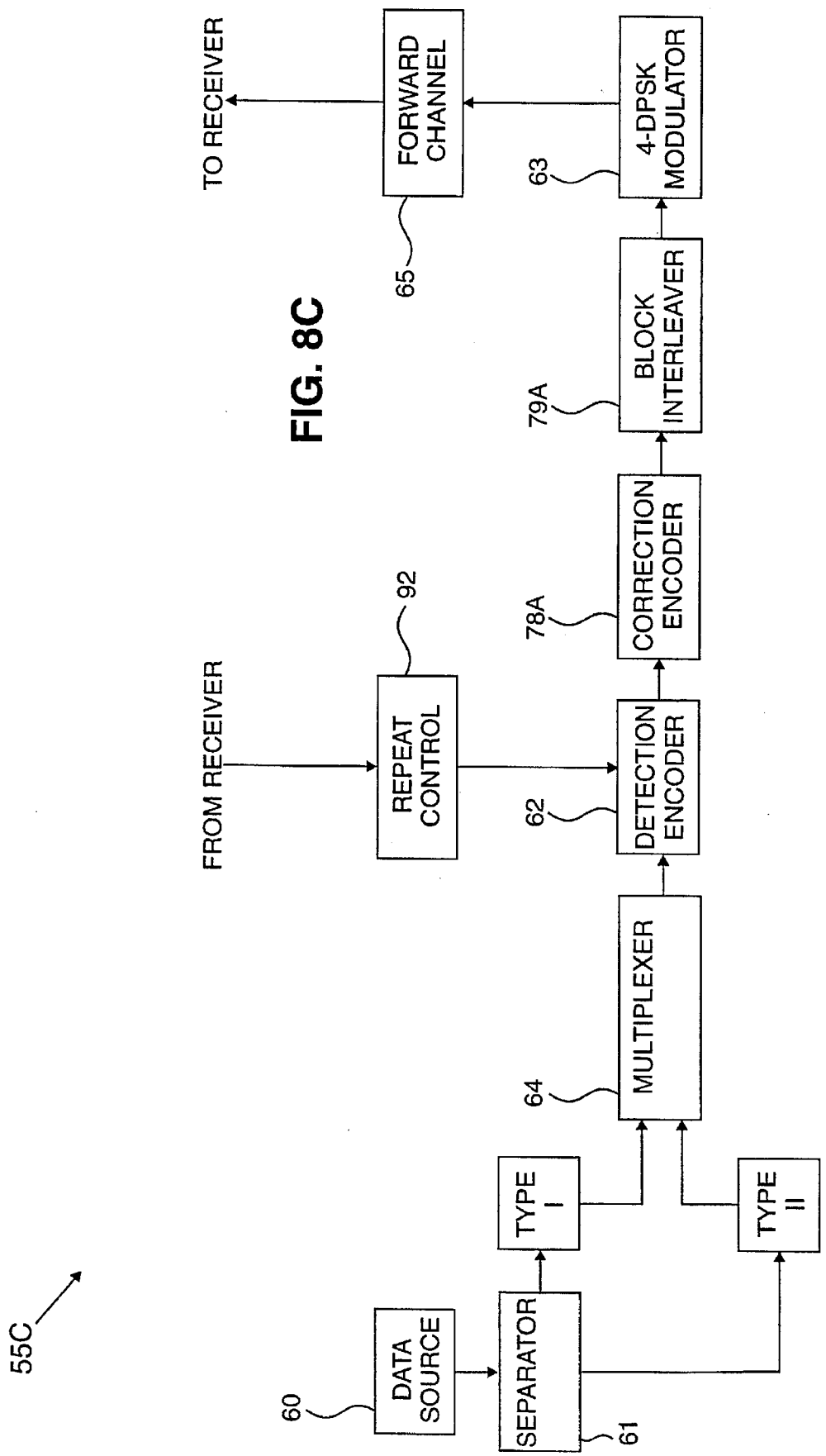

FIG. 8C shows another illustrative embodiment of the present invention, namely a transmitter 55C with multiplexer 64 placed in advance of the encoding process rather than after the encoding process. As mentioned above, multiplexer 64 serves to multiplex the Type-I and Type-II information packets to take advantage of the time slots between transmissions of Type-I packets.

After being multiplexed, the error detection encoder 62 appends an error detection code to each packet for use with the ARQ retransmission protocol described above and the error correction encoder 78A further encodes each Type-I packet, by way of example, with a ½ repetition code, which means that each Type-I packet is transmitted twice whereas each Type-II packet is only transmitted once. The packet stream for this embodiment is shown in FIG. 6B.

A complementary receiver 56C (not shown) is provided with this embodiment.

Illustrative Embodiments for Slow Fading Channels

Further embodiments of the present invention are set forth in three co-pending patent applications to Weerackody which use novel antenna diversity schemes to reduce the effects of multipath fading on slow fading wireless channels. The antenna diversity techniques serve to increase the correcting power, and thus the error protection power, of an FEC code.

The first Weerackody application is entitled "SWITCHED ANTENNA DIVERSITY TRANSMISSION METHOD AND SYSTEM," Application Ser. No. 08/414,987, filed on Mar. 31, 1995. The second Weerackody application is entitled "FAST FADING PACKET DIVERSITY TRANSMISSION METHOD AND SYSTEM," application Ser. No. 08/485,928, filed on Jun. 7, 1995. The third Weerackody application is entitled "ORTHOGONAL POLARIZATION AND TIME VARYING PHASE OFFSETTING OF SIGNALS FOR DIGITAL DATA TRANSMISSION OR RECEPTION" application Ser. No. 08/159,880 filed on Nov. 30, 1993. In addition, the antenna diversity techniques in U.S. Pat. No. 5,305,353 to Weerackody may also be used to reduce the effects of multipath fading on slow fading channels and therefore constitute further embodiments of the present invention. The Weerackody '353 patent and the three Weerackody patent applications referred to above are incorporated by reference herein.

Illustrative Storage Embodiments

The present invention may also be used to reduce the storage requirements for a JPEG image and thus the costs associated with storing a JPEG image. In this regard, the present invention is applicable to any type of storage device known to those of ordinary skill in the art, including, for example, electronic storage devices, magnetic storage devices, optical storage devices, electro-optical storage devices, and magneto-optical storage devices.

Figure 9A:
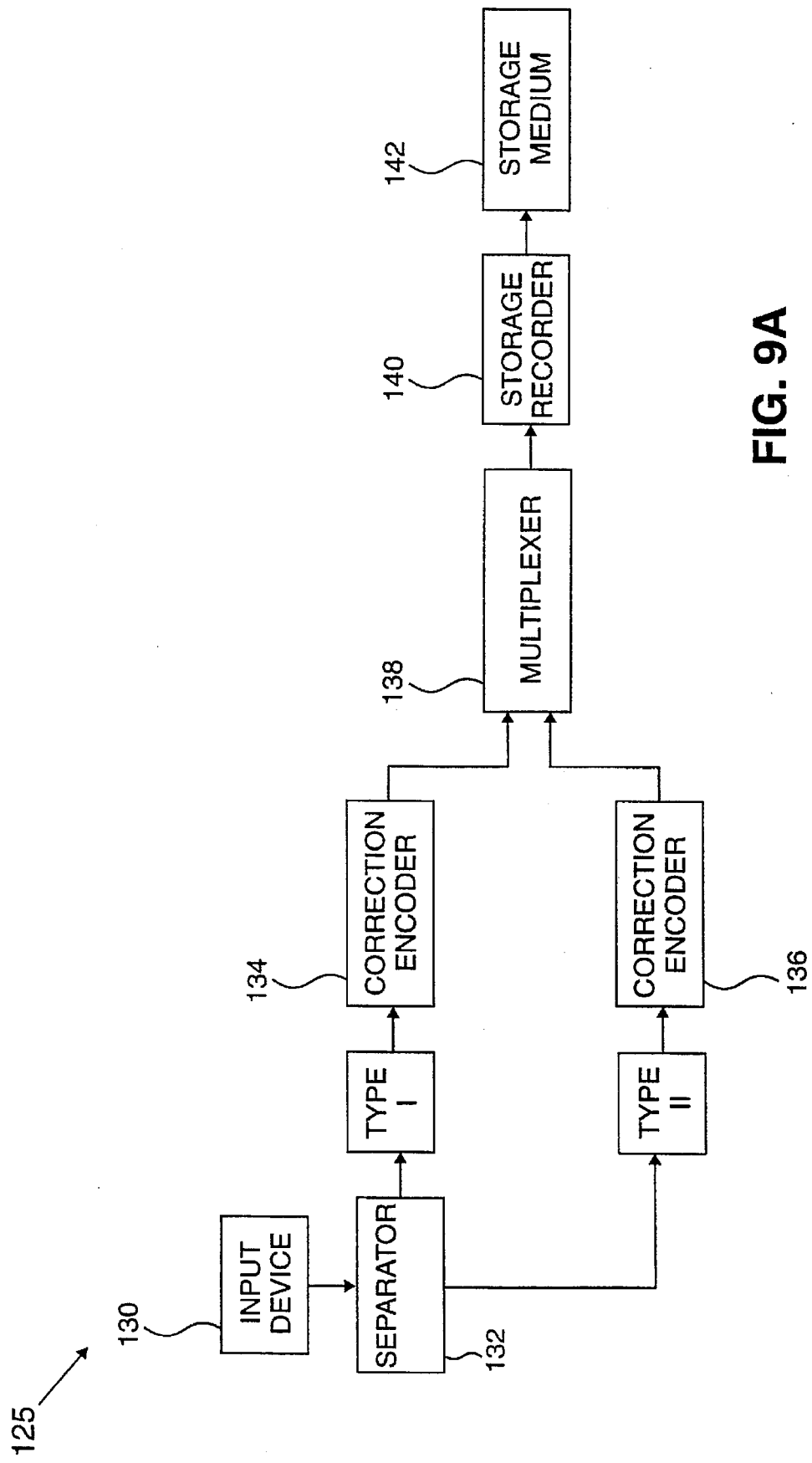
FIGS. 9A–9D show illustrative storage embodiments of the present invention.
Figure 9B:
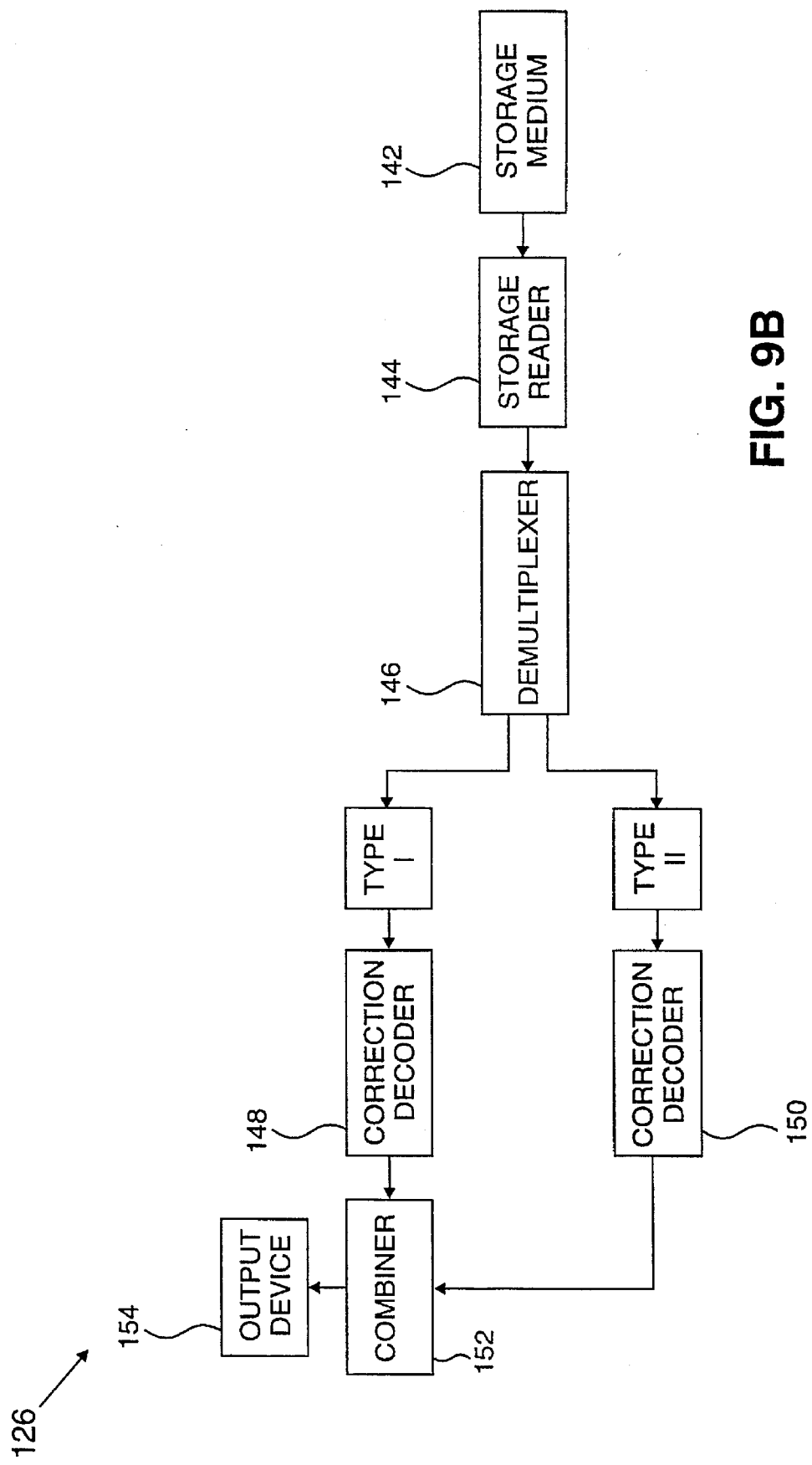

An illustrative storage system of the present invention is shown in FIGS. 9A and 9B. FIG. 9A shows a recorder 125 according to the present invention, and FIG. 9B shows a reader 126 according to the present invention.

The illustrative recorder 125 in FIG. 9A includes a separator 132, error correction encoders 134 and 136, a multiplexer 138, and a storage recorder (or writing) device 140.

The illustrative reader 126 includes a storage reading (or playing) device 144, a demultiplexer 146, error correction decoders 148 and 150, and a combiner 152.

In operation, the JPEG image is input from an input device 130, which may be a standard JPEG encoder. The separator 132 in the recorder 125 separates the JPEG image into Type-I and Type-II information as described above for the other embodiments of the present invention.

The error correction encoders 134 and 136 encode the Type-I and Type-II information with unequal error correction, wherein the Type-I information is encoded with more powerful error protection than the Type-II information. For example, in the case of an optical storage disc, the Type-I information may be encoded with a more powerful Reed-Solomon code than the Type-II information.

The multiplexer multiplexes the encoded Type-I and Type-II information, as required for a particular application, for storage by the storage recorder 140 in or on the storage medium 142.

The storage reader 144, in turn, is used to retrieve or read the JPEG information from the storage medium 142. As the Type-I and Type-II information is read from the storage device it is demultiplexed for decoding on separate channels by the error correction decoders 148 and 150. The decoded Type-I and Type-II information is then combined by the combiner 152 for use by output device 154. For example, the output device 154 may be a suitable display device or standard JPEG decoder.

In another illustrative storage embodiment, the separator 132 may further separate the JPEG image into Type-IA, Type-IB, and Type-II information and the combiner 152 may re-create the JPEG image from the Type-IA, Type-IB, and Type-II information.

Figure 9C:
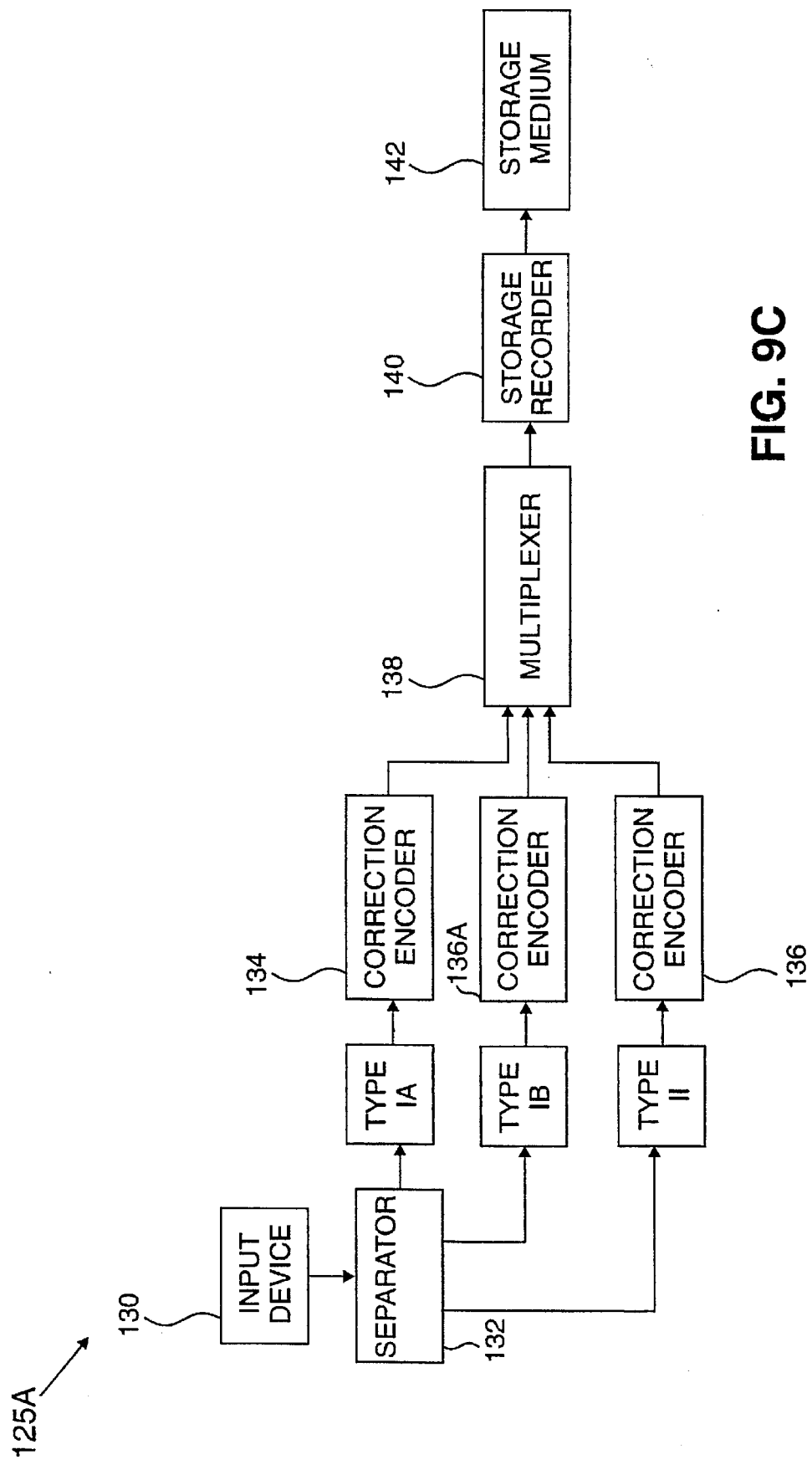
Figure 9D:
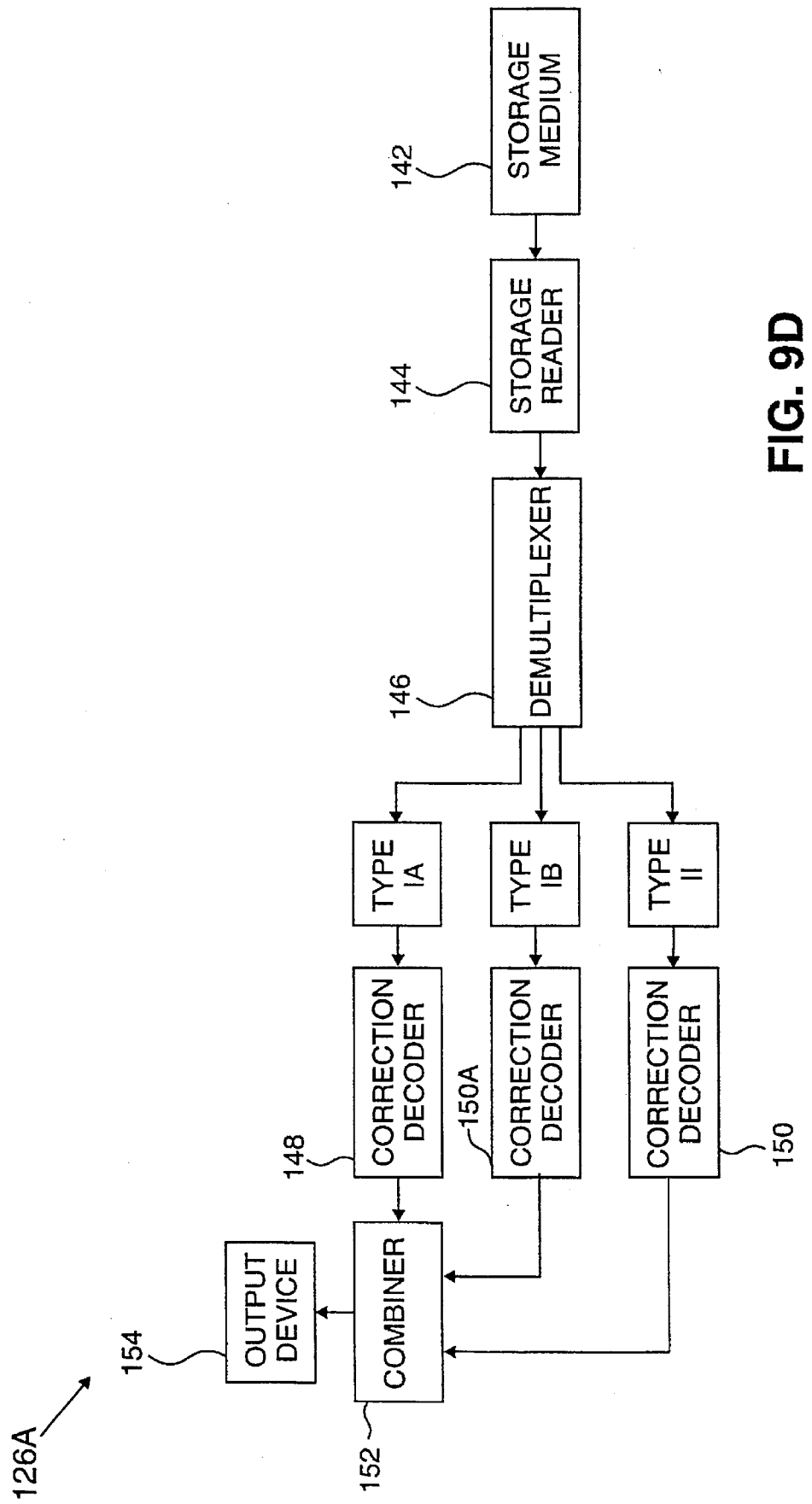

This embodiment is shown in FIGS. 9C and 9D. Specifically, a recorder 125A is shown in FIG. 9C, and a reader (or player) 126A is shown in FIG. 9D. This embodiment is a modification of the embodiment shown in FIGS. 9A and 9B. In this embodiment, an additional encoding channel has been added to the recorder 125, and an additional decoding channel has been added to the reader 126, for the Type-IB information.

As shown in FIG. 9C, the additional encoding channel includes encoder 136A. As shown in FIG. 9D, the additional decoding channel includes decoder 150A. The Type-IB information may be encoded with a Reed-Solomon code or other error correction code which is less powerful than the error correction code being used for the Type-I information.

Various changes and modifications of the present invention will be readily apparent to those of ordinary skill in the art, and all such changes and modifications are considered to fall within the scope of the invention as defined by the appended claims.

We claim:

1. An apparatus for transmitting a JPEG image over a communication medium to a receiver, comprising:

a separator for separating the JPEG image into Type-I and Type-II information; and a transmitter for transmitting the Type-I information over the communication medium with more powerful error protection than the Type-II information.

2. An apparatus for receiving Type-I and Type-II information of a JPEG image transmitted over a communication medium with unequal error protection, comprising:

a receiver adapted for processing the Type-I and Type-II information; and a combiner for combining the processed Type-I and Type-II information.

3. An apparatus for transmitting a JPEG image over a communication medium to a receiver, comprising:

a separator for separating the JPEG image into Type-IA and Type-IB information; and a transmitter for transmitting the Type-IA information over the communication medium with more powerful error protection than the Type-IB information.

4. An apparatus for receiving Type-IA and Type-IB information of a JPEG image transmitted over a communication medium with unequal error protection, comprising:

a receiver adapted for processing the Type-IA and Type-IB information; and a combiner for combining the processed Type-IA and Type-IB information.

5. A transmitter for transmitting a JPEG image over a communication medium to a receiver with unequal error protection, comprising:

an error detection encoder for encoding Type-I information of the JPEG image with an error detection code;

a modulator for modulating the error detection encoded Type-I information and for modulating Type-II information of the JPEG image for transmission over a forward channel of the communication medium to the receiver; and a repeat controller for re-transmitting the error detection encoded Type-I information in response to a retransmission request from the receiver transmitted over a feedback channel of the communication medium.

6. The transmitter of claim 5, further comprising a separator for separating the JPEG image into Type-I and Type-II information.

7. The transmitter of claim 5, further comprising an error correction encoder for encoding the Type-II information with an error correction code.

8. The transmitter of claim 5, further comprising an error correction encoder for encoding the Type-I information with an error correction code.

9. A transmitter for transmitting a JPEG image over a communication medium to a receiver with unequal error protection, comprising:

an error correction encoder for encoding the Type-I information with an error correction code; and a modulator for modulating the error correction encoded Type-I information and for modulating Type-II information of the JPEG image for transmission over the communication medium to the receiver.

10. The transmitter of claim 9, further comprising a separator for separating the JPEG image into Type-I and Type-II information.

11. The transmitter of claim 9, further comprising an error correction encoder for encoding the Type-II information with a less powerful error correction code than the Type-I information.

12. A receiver adapted for processing modulated, error detection encoded Type-I information and modulated Type-II information of a JPEG image transmitted over a forward channel of a communication medium with unequal error protection, comprising:

a demodulator for demodulating the Type-I and Type-II information;

an error detection decoder for decoding the demodulated Type-I information to determine if there are any errors in the Type-I information; and a repeat generator for sending a retransmission request to the transmitter over a feedback channel of the communication medium if errors are detected in the Type-I information.

13. The receiver of claim 12, further comprising a combiner for combining the Type-I and Type-II information.

14. The receiver of claim 12, wherein the modulated Type-II information is encoded with an error correction code, further comprising an error correction decoder for decoding the Type-II information.

15. The receiver of claim 12, wherein the Type-I information is further encoded with an error correction code, further comprising an error correction decoder for decoding the encoded Type-I information.

16. The receiver of claim 12, further comprising a processor for detecting hexadecimal ff bytes in the demodulated Type-II information and for replacing at least one f of each detected ff byte with a random bit pattern.

17. A receiver adapted for processing modulated, error correction encoded Type-I information and modulated Type-II information of a JPEG image transmitted over a communication medium with unequal error protection, comprising:

a demodulator for demodulating the Type-I and Type-II information; and an error correction decoder for decoding the demodulated Type-I information.

18. The receiver of claim 17, further comprising a combiner for combining the decoded Type-I and Type-II information.

19. The receiver of claim 17, wherein the modulated Type-II information is encoded with an error correction code, further comprising an error correction decoder for decoding the Type-II information.

20. The receiver of claim 17, further comprising a processor for detecting hexadecimal ff bytes in the decoded Type-II information and for replacing at least one f of each detected ff byte with a random bit pattern.

21. A method of transmitting a JPEG image over a communication medium to a receiver with unequal error protection, comprising:

separating the JPEG image into Type-I and Type-II information; and transmitting the Type-I information over the communication medium to the receiver with more powerful error protection than the Type-II information.

22. A method of receiving Type-I and Type-II information of a JPEG image transmitted over a communication medium with unequal error protection, comprising:

receiving the Type-I and Type-II information from the communication medium;

processing the Type-I and Type-II information; and combining the processed Type-I and Type-II information.

23. A method of transmitting a JPEG image over a communication medium to a receiver, comprising:

separating the JPEG image into Type-IA and Type-IB information; and transmitting the Type-IA information over the communication medium to the receiver with more powerful error protection than the Type-IB information.

24. A method of receiving Type-IA and Type-IB information of a JPEG image transmitted over a communication medium with unequal error protection, comprising:

receiving the Type-IA and Type-IB information from the communication medium;

processing the Type-IA and Type-IB information; and combining the processed Type-IA and Type-IB information.

25. A method of transmitting a JPEG image over a communication medium to a receiver with unequal error protection, comprising:

encoding Type-I information of the JPEG image with an error detection code;

modulating the error detection encoded Type-I information for transmission over a forward channel of the communication medium to the receiver;

modulating Type-II information of the JPEG image for transmission over the forward channel of the communication medium to the receiver; and re-transmitting the error detection encoded Type-I information in response to a retransmission request from the receiver transmitted over a feedback channel of the communication medium.

26. The method of claim 25, further comprising the step of separating the JPEG image into Type-I and Type-II information.

27. The method of claim 25, further comprising the step of encoding the Type-II information with an error correction code.

28. The method of claim 25, further comprising the step of encoding the Type-I information with an error correction code.

29. A method of transmitting a JPEG image over a communication medium to a receiver with unequal error protection, comprising:

encoding Type-I information of the JPEG image with an error correction code;

modulating the error correction encoded Type-I information for transmission over the communication medium to the receiver; and modulating Type-II information of the JPEG image for transmission over the communication medium to the receiver.

30. The method of claim 29, further comprising the step of separating the JPEG image into Type-I and Type-II information.

31. The method of claim 29, further comprising the step of encoding the Type-II information with a less powerful error correction code than the Type-I information.

32. A method of receiving modulated, error detection encoded Type-I information and modulated Type-II information of a JPEG image transmitted over a forward channel of a communication medium with unequal error protection, comprising:

demodulating the Type-I and Type-II information;

decoding the error detection code of the demodulated Type-I information to determine if there are any errors in the Type-I information; and sending a retransmission request to the transmitter over a feedback channel of the communication medium if errors are detected in the Type-I information.

33. The method of claim 32, further comprising the step of combining the Type-I and Type-II information.

34. The method of claim 32, wherein the modulated Type-II information is encoded with an error correction code, further comprising the step of decoding the encoded Type-II information.

35. The method of claim 32, wherein the Type-I information is encoded with an error correction code, further comprising the step of decoding the Type-I information.

36. The method of claim 32, further comprising the steps of detecting hexadecimal ff bytes in the demodulated Type-II information and replacing at least one f of each detected ff byte with a random bit pattern.

37. A method of receiving processing modulated, error correction encoded Type-I information and modulated Type-II information transmitted over a communication medium with unequal error protection, comprising:

demodulating the Type-I and Type-II information; and decoding the demodulated Type-I information.

38. The method of claim 37, further comprising the step of combining the Type-I and Type-II information.

39. The method of claim 37, wherein the Type-II information is encoded with an error correction code, further comprising the step of decoding the Type-II information.

40. The method of claim 37, further comprising the steps of detecting hexadecimal ff bytes in the Type-II information and replacing at least one f of each detected ff byte with a random bit pattern.

41. An apparatus for detecting the occurrence of Type-I information in Type-II information of a JPEG image, comprising:

a processor for detecting hexadecimal ff bytes in the Type-II information and for replacing at least one f of each detected ff byte with a random bit pattern.

42. A method of detecting the occurrence of Type-I information in Type-II information of a JPEG image, comprising:

detecting hexadecimal ff bytes in the Type-II information; and replacing at least one f of each detected ff byte with a random bit pattern.

* * * * *